US012748374B2

(12) United States Patent
Yeu et al.

(10) Patent No.: US 12,748,374 B2
(45) Date of Patent: Sep. 29, 2026

(54) IMAGE FORMING APPARATUS

(71) Applicant: CANON KABUSHIKI KAISHA, Tokyo (JP)

(72) Inventors: Hosu Yeu, Shizuoka (JP); Masataka Mochizuki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/905,348

(22) Filed: Oct. 3, 2024

(65) Prior Publication Data

US 2025/0116963 A1 Apr. 10, 2025

(30) Foreign Application Priority Data

Oct. 5, 2023 (JP) ................................ 2023-173536

(51) Int. Cl.
*G03G 21/18* (2006.01)

(52) U.S. Cl.
CPC ....... *G03G 21/185* (2013.01); *G03G 21/1875* (2013.01)

(58) Field of Classification Search
CPC ........... G03G 21/1666; G03G 21/1633; G03G 21/1853; G03G 21/1647; G03G 21/185
See application file for complete search history.

(56) References Cited

U.S. PATENT DOCUMENTS

| | | | | |
|---|---|---|---|---|
| 9,645,537 | B2 | 5/2017 | Tamagaki et al. | |
| 2009/0016768 | A1* | 1/2009 | Seorl .................. | G03G 21/1647 399/107 |
| 2020/0133197 | A1* | 4/2020 | Kaida ................ | G03G 15/5033 |
| 2021/0096493 | A1* | 4/2021 | Kyotani ............ | G03G 15/5012 |

FOREIGN PATENT DOCUMENTS

| | | | |
|---|---|---|---|
| JP | 2015-232658 | A | 12/2015 |
| JP | 2020071424 | A * | 5/2020 |

* cited by examiner

*Primary Examiner* — Jessica L Eley
(74) *Attorney, Agent, or Firm* — Venable LLP

(57) ABSTRACT

An image forming apparatus includes an apparatus main body, an image bearing member, a first cartridge that has a charging member, a second cartridge, an exposure unit that has a light-emitting portion that is capable of switching between an emitting state and a non-emitting state, the exposure unit entering the non-emitting state in a state in which the second cartridge is detached from the apparatus main body, a current detecting portion that detects a charge current flowing in the charging member, a potential changing portion that changes a potential of a surface of the image bearing member, and a determination portion that determines whether or not the first cartridge is attached to the apparatus main body, and whether or not the second cartridge is attached to the apparatus main body, on the basis of the charge current detected by the current detecting portion.

15 Claims, 16 Drawing Sheets

IMAGE FORMING APPARATUS

BACKGROUND OF THE INVENTION

Field of the Invention

The present invention relates to an image forming apparatus.

Description of the Related Art

In an image forming apparatus such as a printer or the like using an electrophotographic image forming system (electrophotographic process), an image bearing member such as an electrophotographic photosensitive member (photosensitive member) or the like is uniformly charged, and the charged image bearing member is selectively exposed, thereby forming an electrostatic latent image on the image bearing member. The electrostatic latent image formed on the image bearing member is visualized as a toner image with a developer (also referred to as "toner") by a developing apparatus. The toner image formed on the image bearing member is then transferred onto a recording material such as recording paper, plastic sheets, or the like, and the toner image transferred onto the recording material is further subjected to heat and pressure, whereby the toner image is fixed onto the recording material, and thus image formation (image recording) is performed.

In recent years, diversification in user needs has led to image forming apparatuses, which use electrophotographic image forming process, in a two-unit form, in which each cartridge is separated into two units, in accordance with functions thereof. In such image forming apparatuses in which two or more cartridges are detachably attachable, a configuration is preferable in which whether or not cartridges are attached to the image forming apparatus is detectable, in order to properly carry out image forming actions. Japanese Patent Application Publication No. 2015-232658 discloses a configuration in which two cartridges, which are a process cartridge and a toner cartridge, are detachably attached to an apparatus main body, and whether or not the toner cartridge is attached is detectable on the basis of transfer current.

SUMMARY OF THE INVENTION

However, in a case of accurately detecting by transfer current whether or not cartridges are attached as in the above-described configuration, there has been a need to rotate image bearing members over a long period of time, in order to suppress effects of resistance variance of transfer rollers that occurs in accordance with usage environments and number of prints printed. Also, the above-described configuration is configured to be capable of detecting whether or not just one cartridge is attached.

Accordingly, it is an object of the present invention to provide an image forming apparatus that is capable of efficiently detecting whether or not two or more cartridges are attached.

In order to achieve the object described above, an image forming apparatus according to the present invention includes:

an apparatus main body;

an image bearing member that bears a developer image;

a first cartridge that has a charging member that charges the image bearing member, and that is detachably attachable to the apparatus main body;

a second cartridge that is detachably attachable to the apparatus main body;

an exposure unit that has a light-emitting portion capable of emitting light, and that is capable of switching between an emitting state in which light is emitted from the light-emitting portion to the image bearing member and a non-emitting state in which light is not emitted from the light-emitting portion to the image bearing member, the exposure unit entering the non-emitting state in a state in which the second cartridge is detached from the apparatus main body;

a current detecting portion that detects a charge current flowing in the charging member;

a potential changing portion that changes a potential of a surface of the image bearing member; and a determination portion that determines whether or not the first cartridge is attached to the apparatus main body, and whether or not the second cartridge is attached to the apparatus main body, on the basis of the charge current detected by the current detecting portion.

According to the present invention, an image forming apparatus can be provided that is capable of efficiently detecting whether or not two or more cartridges are attached.

Further features of the present invention will become apparent from the following description of exemplary embodiments with reference to the attached drawings.

DESCRIPTION OF THE EMBODIMENTS

An image forming apparatus according to an embodiment of the present invention will be described in further detail below with reference to the drawings. Note that dimensions, materials, shapes, relative placements thereof, and so forth, of components described in the embodiments, should be changed as appropriate in accordance with configurations of apparatuses to which the present invention is applied and various types of conditions. That is to say, the scope of the present invention is not limited to the embodiments described below.

In the following description, a case will be described regarding applying the present invention to an image forming apparatus using an electrophotographic image forming system, which forms images on recording media using a series of electrophotography image forming processes of charging, exposing, developing, transferring, and cleaning, of a photosensitive drum that is an image bearing member. Examples of the image forming apparatus using the electrophotographic image forming system include an electrophotographic printer (LED printer, laser beam printer, etc.), electrophotographic facsimile apparatus, and so forth.

First Embodiment

Configuration of Image Forming Apparatus

Figure 1:
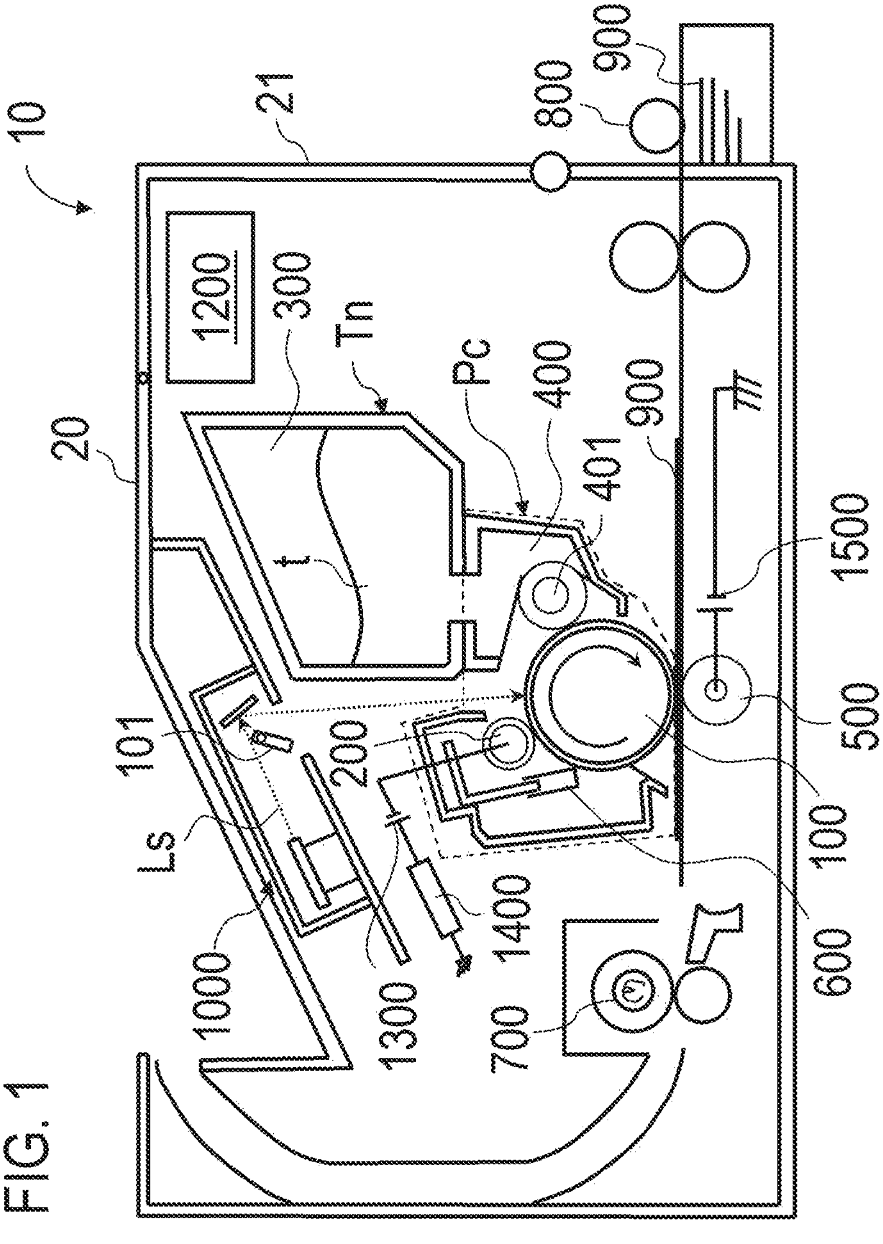
FIG. 1 is a schematic diagram of an entirety of an image forming apparatus according to a first embodiment.

An image forming apparatus 10 according to a first embodiment of the present invention will be described. FIG. 1 is a schematic cross-sectional view illustrating a schematic configuration of the image forming apparatus 10. Attached to an apparatus main body 20 of the image forming apparatus 10 are two cartridges, which are a process cartridge Pc (first cartridge) and a toner cartridge Tn (second cartridge).

The process cartridge Pc is configured including a photosensitive drum 100, a charging roller 200 that uniformly charges a surface of the photosensitive drum 100, a developing roller 401 that develops with toner, a developing chamber 400 that accommodates toner, a cleaning apparatus 600, and so forth. A general outline of the process cartridge Pc is illustrated in FIG. 1 by a dashed line. The toner cartridge Tn is configured including a toner accommodation chamber 300 serving as a developer accommodation portion for accommodation therein of toner t serving as a developer, and supplies the toner t to the developing chamber 400 of the process cartridge Pc. The process cartridge Pc and the toner cartridge Tn are each configured to be detachably attachable to the apparatus main body 20 of the image forming apparatus 10. That is to say, the photosensitive drum 100, the charging roller 200, the developing roller 401, and so forth, are integrally detachably attachable to the apparatus main body 20.

On a front of the apparatus main body 20 of the image forming apparatus 10 is provided a door 21 that is a cartridge door configured to be capable of opening/closing with respect to an opening portion formed in the apparatus main body 20. When the door 21 is in an open state, a user can extract the process cartridge Pc or the toner cartridge Tn from inside of the apparatus main body 20 through the opening portion, or perform insertion thereof into the apparatus main body 20 so as to attach therein.

The photosensitive drum 100, serving as the image bearing member regarding which an electrostatic latent image is formed on the surface thereof, is a rotatable drum-like (cylindrical) photosensitive member (electrophotographic photosensitive member). Driving force from a drum driving motor (omitted from illustration) serving as driving means is transmitted to the photosensitive drum 100, and thus is rotationally driven in a direction of an arrow in FIG. 1 (clockwise direction) about a rotation shaft thereof.

The charging roller 200 is a roller type charging member (charging means) for charging the photosensitive drum 100. Negative voltage is applied to the charging roller 200 from a power source 1300 at a predetermined timing, and the charging roller 200 uniformly negatively charges the photosensitive drum 100.

The image forming apparatus 10 includes a laser exposing unit 1000 as an exposing apparatus (exposing means) for exposing the photosensitive drum 100. The laser exposing unit 1000 has a light-emitting portion that is capable of emitting laser light Ls as light to expose the photosensitive drum 100. The surface of the photosensitive drum 100 that has been subjected to charging processing is subjected to scanning exposure by the laser light Ls, illustrated by a dotted line in FIG. 1, by the laser exposing unit 1000, and an electrostatic latent image (electrostatic image) is formed on the photosensitive drum 100 in accordance with image signals.

A shutter member 101 that blocks or opens a path (optical path) over which the laser light Ls travels, by pivoting actions, is disposed in the laser exposing unit 1000 according to the first embodiment. The pivoting actions of the shutter member 101 are performed in coordination with predetermined actions, such as attaching/detaching actions of the process cartridge Pc, attaching/detaching actions of the toner cartridge Tn, opening/closing actions of the door 21, and so forth, which will be described in detail later. The laser exposing unit 1000 is configured to be capable of switching between an emitting state in which light is emitted to the photosensitive drum 100 from the light-emitting portion, and a non-emitting state in which light is not emitted to the photosensitive drum 100 from the light-emitting portion, by the shutter member 101.

The developing roller 401 is a rotatable developing member to which developing bias is applied. Toner is supplied by the developing roller 401 to the photosensitive drum 100 on which an electrostatic latent image is formed, thereby implementing development thereon, and the electrostatic latent image becomes visible as a toner image (developer image). That is to say, the developing roller 401 functions as a developer supply member that supplies toner to the photosensitive drum 100. In the first embodiment, the developing roller 401 is provided so as to be capable of abutting against and separating from the photosensitive drum 100, by an abutting/separating mechanism (omitted from illustration).

The image forming apparatus 10 includes a transfer roller 500 serving as a rotatable transfer member that transfers the now-visible toner image on the photosensitive drum 100 onto a recording material 900. The transfer roller 500 is disposed in contact with the photosensitive drum 100, forming a contact portion (transfer nip, transfer portion) along with the photosensitive drum 100. Transfer bias is applied to the transfer roller 500 by a power source 1500.

The toner image formed on the surface of the photosensitive drum 100 is sent to the contact portion of the photosensitive drum 100 and the transfer roller 500 in accordance with rotation of the photosensitive drum 100. The recording material 900 serving as a recording medium is then conveyed to the contact portion in conjunction with a timing of the toner image being sent to the contact portion, and the toner image is transferred onto the recording material 900. The recording material 900, such as paper or the like, is accommodated in a cassette, and is separated one sheet at a time by a feeding roller 800 or the like, and is sent out from the cassette toward the contact portion.

Transfer residual toner remaining on the surface of the photosensitive drum 100 is removed from the surface thereof by the cleaning apparatus 600. The cleaning apparatus 600 is configured including a cleaning blade serving as a cleaning member, and a waste toner container that accommodates transfer residual toner (waste toner).

The image forming apparatus 10 includes a fixing apparatus 700 serving as fixing means for fixing, onto the recording material 900, the toner image that is transferred onto the recording material 900. The fixing apparatus 700 pressurizes and heats the toner image on the recording material 900, in a process of gripping and conveying the recording material 900 bearing the unfixed toner image by a fixing roller pair, thereby fixing (fusing, sticking) the toner image onto the recording material 900. The recording material 900 to which the toner image is fixed is discharged (output) to a discharge portion provided outside of the apparatus main body 20 of the image forming apparatus 10, as an image-formed article.

In this way, on a periphery of the photosensitive drum 100 are disposed a charging apparatus including the charging roller 200, the developing apparatus including the developing roller 401 and the developing chamber 400, a transfer apparatus including the transfer roller 500, and the cleaning apparatus 600, in that order. Also, an exposure portion to which the laser light Ls is emitted from the laser exposing unit 1000 serving as the exposing apparatus, is situated between the charging roller 200 and the developing roller 401 on the periphery of the photosensitive drum 100.

Control Configuration of Image Forming Apparatus

Figure 2:
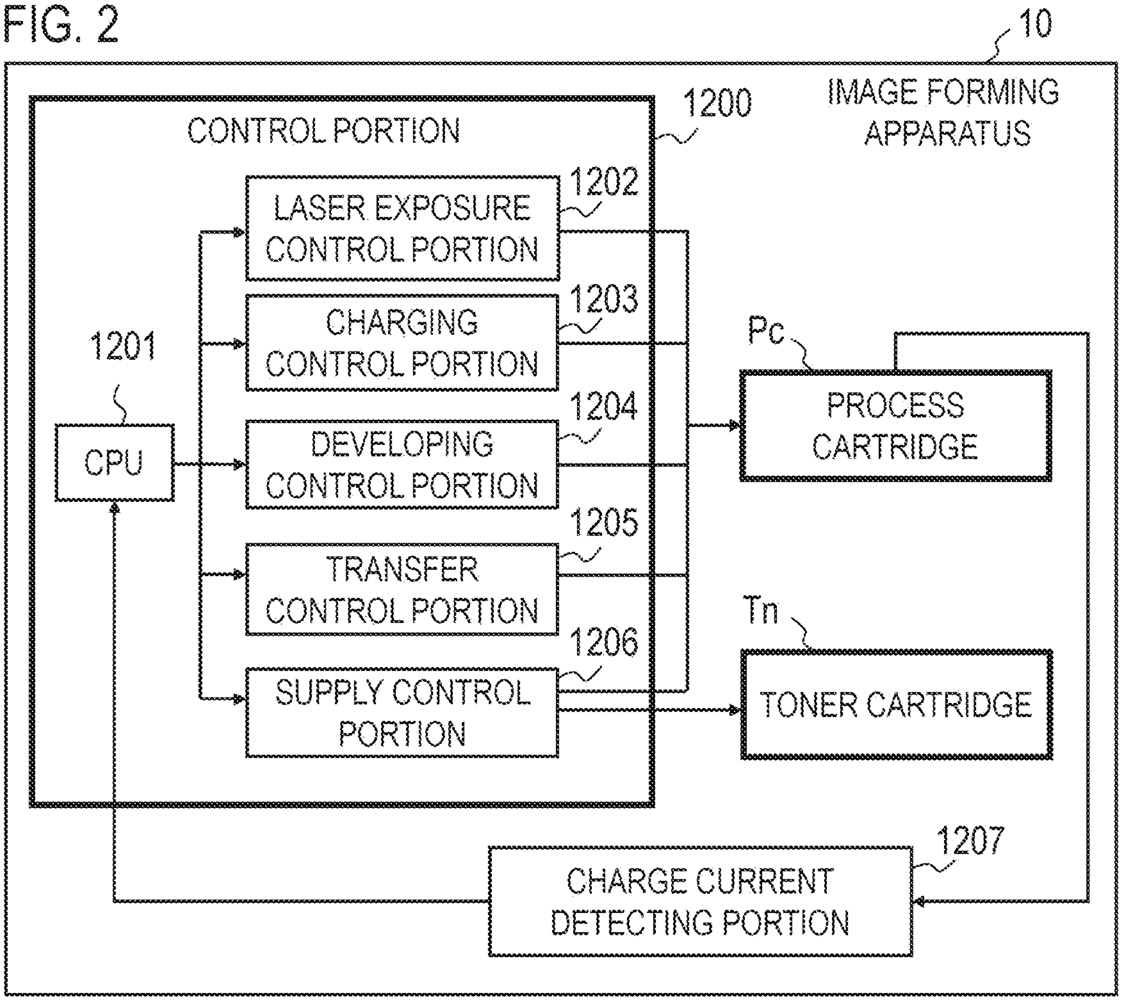
FIG. 2 is a control block diagram of the image forming apparatus according to the first embodiment.

Next, a control configuration of the image forming apparatus 10 will be described. FIG. 2 is a control block diagram illustrating the control configuration of the image forming apparatus 10. A control portion (engine control portion) 1200 of the image forming apparatus 10 is configured including a central processing unit (CPU) 1201 that is a computing portion, a laser exposure control portion 1202, a charging control portion 1203, a developing control portion 1204, a transfer control portion 1205, and a supply control portion 1206. The CPU 1201 is connected to each of the laser exposure control portion 1202, the charging control portion 1203, the developing control portion 1204, the transfer control portion 1205, and the supply control portion 1206, and sends signals to each control portion. The charging control portion 1203, the developing control portion 1204, and the transfer control portion 1205 control actions of predetermined members of the process cartridge Pc to perform image forming. Also, the supply control portion 1206 is connected to the process cartridge Pc and the toner cartridge Tn, and performs supply actions of supplying toner within the toner cartridge Tn to the process cartridge Pc.

Also, the image forming apparatus 10 includes a charge current detecting portion 1207 that is connected to the charging roller 200 of the process cartridge Pc and that detects current flowing in the charging roller 200. Charge current value information of the current flowing in the charging roller 200 detected by the charge current detecting portion 1207 is communicated to the CPU 1201.

Shutter Opening/Closing Mechanism

Next, a shutter opening/closing mechanism (moving mechanism) of the shutter member 101 that blocks and opens the optical path of the laser light Ls will be described with reference to FIGS. 3A to 3E, 4A to 4C, 5A to 5D, 6A to 6D, and 7A to 7C. The shutter opening/closing mechanism that moves the shutter member 101 is made up of a shutter opening/closing member 102, a link mechanism 104, a link mechanism 105, a link mechanism 106, and so forth.

The shutter member 101 is elongated in an axial line direction of the photosensitive drum 100, and is held so as to be pivotable about the axial line direction. The shutter member 101 is a blocking member that is configured to be capable of being moved between an open position in which the optical path of the laser light Ls is opened (not blocked), and a blocking position in which the optical path of the laser light Ls is blocked, by the shutter opening/closing mechanism. When the shutter member 101 is situated in the open position, the laser exposing unit 1000 is in an emitting state, and the laser light Ls is capable of reaching the surface of the photosensitive drum 100 from the light-emitting portion. Conversely, when the shutter member 101 is situated in the closed position, the laser exposing unit 1000 is in a non-emitting state, and the laser light Ls is blocked by the shutter member 101 and does not reach the surface of the photosensitive drum 100.

The shutter opening/closing member 102 is an opening/closing member (shutter moving member) that moves (pivots) the shutter member 101 so as to open/close. In the first embodiment, the shutter opening/closing member 102 is provided so as to be capable of abutting one end portion of the shutter member 101 in a longitudinal direction thereof. The shutter opening/closing member 102 is situated in one of a first position, a second position, a third position, a fourth position, and a fifth position, in accordance with states of attachment of cartridges to the apparatus main body 20 of the image forming apparatus 10, and an open/closed state of the door 21.

An overview of the first to fifth positions is as follows.

First position: A position in a state in which neither the process cartridge Pc nor the toner cartridge Tn is attached to the apparatus main body 20, and also a state in which the door 21 is open with respect to the apparatus main body 20 (open state). The position illustrated in FIGS. 3A to 3E.

Second position: A position in a state in which only the process cartridge Pc is attached to the apparatus main body 20, and also a state in which the door 21 is open. The position illustrated in FIGS. 4A to 4C.

Third position: A position in a state in which both the process cartridge Pc and the toner cartridge Tn are attached to the apparatus main body 20, and also a state in which the door 21 is open. The position illustrated in FIGS. 5A to 5D.

Fourth position: A position in a state in which both the process cartridge Pc and the toner cartridge Tn are attached to the apparatus main body 20, and also a state in which the door 21 is closed with respect to the apparatus main body 20 (closed state). The position illustrated in FIGS. 6A to 6D.

Fifth position: A position in a state in which only the toner cartridge Tn is attached to the apparatus main body 20, and also a state in which the door 21 is open. The position illustrated in FIGS. 7A to 7C.

The link mechanisms 104, 105, and 106 are each a mechanism for moving the shutter member 101, and are provided to the apparatus main body 20. The shutter opening/closing mechanism that includes these link mechanisms and the shutter opening/closing member 102 is provided on one end side of the shutter member 101 in the longitudinal direction thereof. The link mechanism 104 includes a P-link flapper 104*a* and a P-link shaft 104*b*, which act in coordination with attaching/detaching actions of the process cartridge Pc. The link mechanism 105 includes a T-link shaft 105*a*, a T-link shaft tension spring 105*b*, a compression spring 105*c*, and a T-link flapper 105*g*, which act in coordination with attaching/detaching actions of the toner cartridge Tn. The link mechanism 106 includes a door link slider 106*a* and a door link compression spring 106*b*, which act in coordination with opening/closing actions of the door 21. Detailed actions of the respective link mechanisms will be described later.

Hereinafter, details of a configuration of the shutter opening/closing mechanism and the first through fifth positions will be described along with attaching/detaching actions of the cartridges and opening/closing actions of the door 21. Note that in the drawings referenced in description of the first through fifth positions, the process cartridge Pc and the toner cartridge Tn are simplified, and the laser light Ls traveling over the laser optical path is indicated by straight-line arrows, in order to facilitate understanding. Further non-operating members such as supporting members and so forth, the door 21, a laser scanner of the laser exposing unit 1000, and so forth, are omitted from illustration.

In the following description, a direction in which the compression spring 105*c* biases the shutter opening/closing member 102 along the axial direction of the shutter opening/closing member 102 that is a shaft-like member is an X1 direction, and a direction opposite to the X1 direction is an X2 direction. Also, a direction in which the T-link shaft tension spring 105*b* biases the T-link shaft 105*a* along the axial direction of the T-link shaft 105*a* is a Y1 direction, and a direction opposite to the Y1 direction is a Y2 direction. Also, a direction in which the door link compression spring 106*b* biases the door link slider 106*a* in a sliding direction of the door link slider 106*a* is a Z1 direction, and a direction opposite to the Z1 direction is a Z2 direction. In the first embodiment, the X1 (X2) direction is parallel to a rotational axis direction of the photosensitive drum 100, and is orthogonal to each of the Y1 (Y2) direction and the Z1 (Z2) direction.

Also, in the following description, a direction in which the P-link flapper 104*a* pivots when the opening/closing mechanism acts to move the shutter member 101 from the blocking position to the open position is an R1 direction. In the same way, a pivoting direction of the P-link shaft 104*b* is an R2 direction, a pivoting direction of the shutter opening/closing member 102 is an R3 direction, and a pivoting direction of the T-link flapper 105*g* is an R4 direction. As viewed from the X1 direction in the first embodiment, the R1 direction and the R3 direction are clockwise, and the R2 direction and the R4 direction are counterclockwise.

FIGS. 3A to 3E are explanatory diagrams of the shutter opening/closing mechanism in a state in which the shutter opening/closing member 102 is situated at the first position. When neither the process cartridge Pc nor the toner cartridge Tn is attached to the apparatus main body 20 of the image forming apparatus 10, and the door 21 is in the open state, the shutter opening/closing member 102 is situated at the first position. When the shutter opening/closing member 102 is situated at the first position, the shutter member 101 is situated at the blocking position of blocking the laser light Ls, and the laser exposing unit 1000 is in a non-emitting state of not being able to emit the laser light Ls to the photosensitive drum 100.

Figure 3A:
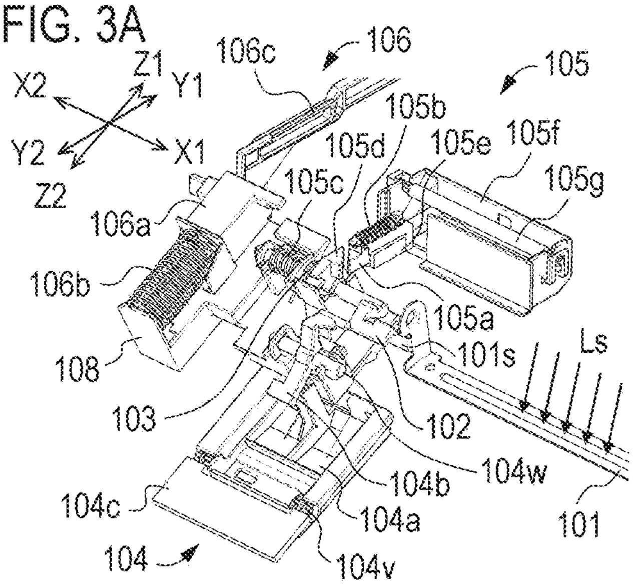
FIGS. 3A to 3E are explanatory diagrams of a shutter opening/closing mechanism in which a shutter member is situated at a first position.
Figure 3B:
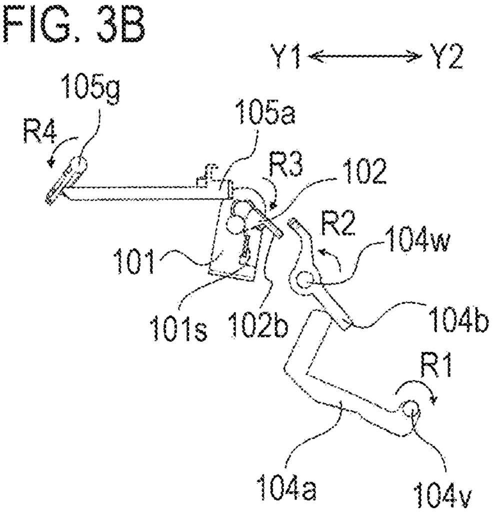
Figure 3C:
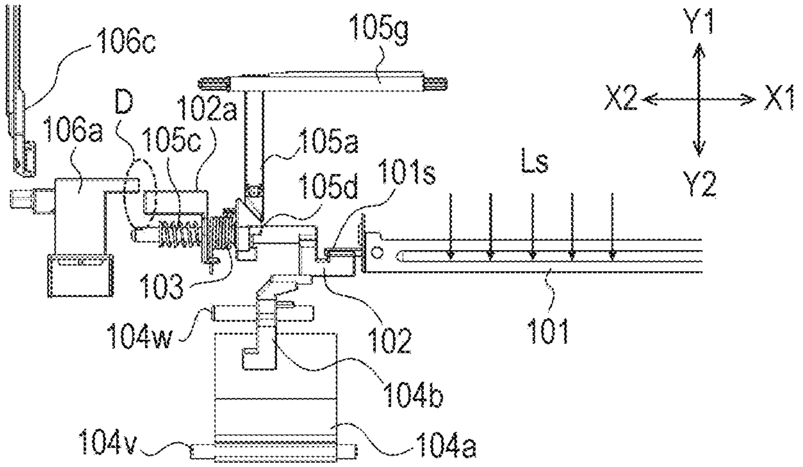
Figure 3D:
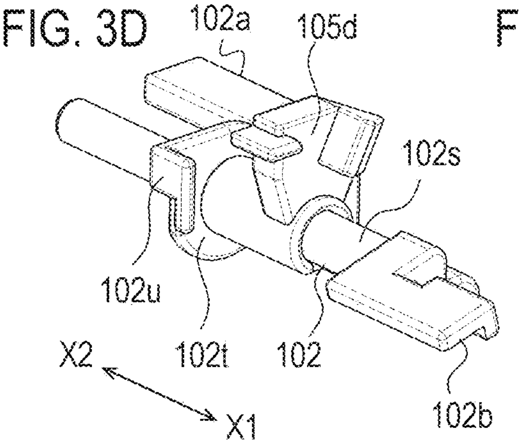
Figure 3E:
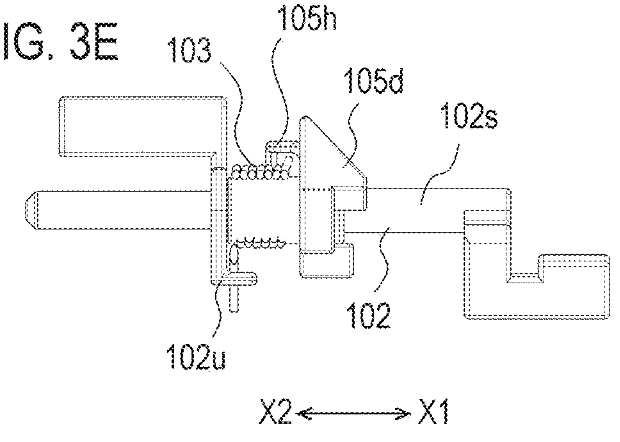

FIG. 3A is a schematic perspective view of the shutter opening/closing mechanism in a state in which the shutter opening/closing member 102 is situated at the first position. FIG. 3B is a side view of FIG. 3A, viewing part of the members of the shutter opening/closing mechanism in the X1 direction. FIG. 3C is a top view of FIG. 3A. FIG. 3D is an enlarged perspective view of the shutter opening/closing member 102 and a T-link cam 105*d* that is attached to the shutter opening/closing member 102. FIG. 3E is an enlarged top view of the shutter opening/closing member 102 and the T-link cam 105*d*. The T-link cam 105*d* is a component member of the link mechanism 105, and will be described in detail later.

First, a configuration of the shutter opening/closing member 102 will be described. The shutter opening/closing member 102 has a shaft portion 102*s*, and is held by a shutter link holder 108 provided to the apparatus main body 20, so as to be capable of pivoting about the shaft portion 102*s* and also linearly moving in the axial line direction of the shaft portion 102*s*. In the first embodiment, the axial line direction of the shaft portion 102*s* (shutter opening/closing member 102) is parallel to the X1 (X2) direction. As illustrated in FIG. 3D, the T-link cam 105*d* is attached to the shutter opening/closing member 102, with one end of a cylindrical portion of the T-link cam 105*d* striking against a cam contact face 102*t* that extends in a radial direction from the shaft portion 102*s* of the shutter opening/closing member 102.

The shutter opening/closing member 102 has an abutting portion 102*a* that abuts the door link slider 106*a* of the link mechanism 106, and an abutting portion 102*b* that abuts the shutter member 101. The abutting portion 102*a* is provided on an X2-direction side with respect to the T-link cam 105*d*, and the abutting portion 102*b* is provided on an X1-direction side with respect to the T-link cam 105*d*. The abutting portion 102*a* abuts the door link slider 106*a* during a process of moving the shutter member 101 from the blocking position to the open position. In the same way, the abutting portion 102*b* abuts the shutter member 101 during a process of moving the shutter member 101 from the blocking position to the open position.

The shutter opening/closing mechanism includes a torsion coil spring 103 that is a biasing member biasing the shutter opening/closing member 102 in the opposite direction from the R3 direction. The shutter opening/closing member 102 is constantly biased by the torsion coil spring 103 so as to return to the first position.

As illustrated in FIG. 3E, the torsion coil spring 103 is wound around the cylindrical portion of the T-link cam 105*d*. Note that only a cross-section of the torsion coil spring 103 is illustrated in FIG. 3E, to facilitate understanding. One end of the torsion coil spring 103 in the axial direction thereof is held by a spring holding portion 102*u* of the shutter opening/closing member 102, and the other end thereof is held by a spring holding portion 105*h* of the T-link cam 105*d*.

Also, the shutter opening/closing member 102 is constantly biased in the X1 direction by the compression spring 105*c*, so as to return to the first position. The X1 direction is a direction that is parallel to the axial direction of the shutter opening/closing member 102, and is a direction heading from the spring holding portion 102*u* toward the spring holding portion 105*h*. Thus, the shutter opening/closing member 102 is constantly biased by the torsion coil spring 103 and the compression spring 105*c*, and returns to the first position when the process cartridge Pc and the toner cartridge Tn are detached from the apparatus main body 20.

Attaching Actions of Process Cartridge Pc

Next, actions of the opening/closing mechanism of the shutter member 101 in conjunction with attaching actions of the process cartridge Pc will be described with reference to FIGS. 3A to 3C and 4A to 4C. The link mechanism 104 acts in coordination with attaching actions of the process cartridge Pc.

Figure 4A:
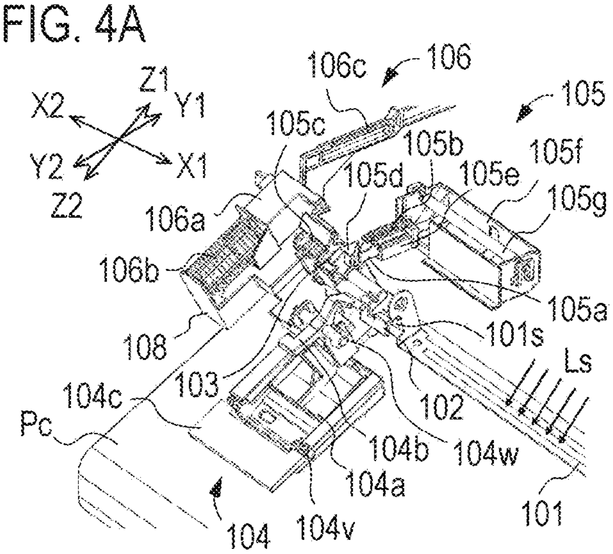
FIGS. 4A to 4C are explanatory diagrams of the shutter opening/closing mechanism in which the shutter member is situated at a second position.
Figure 4B:
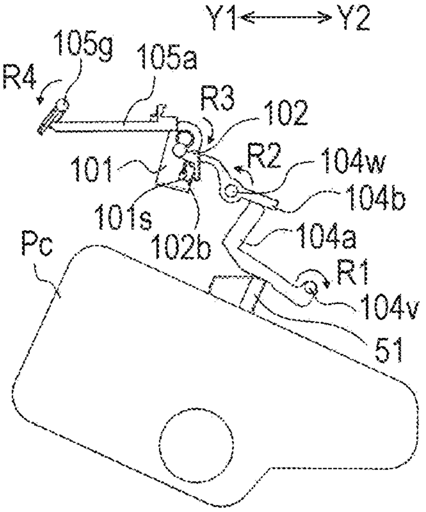
Figure 4C:
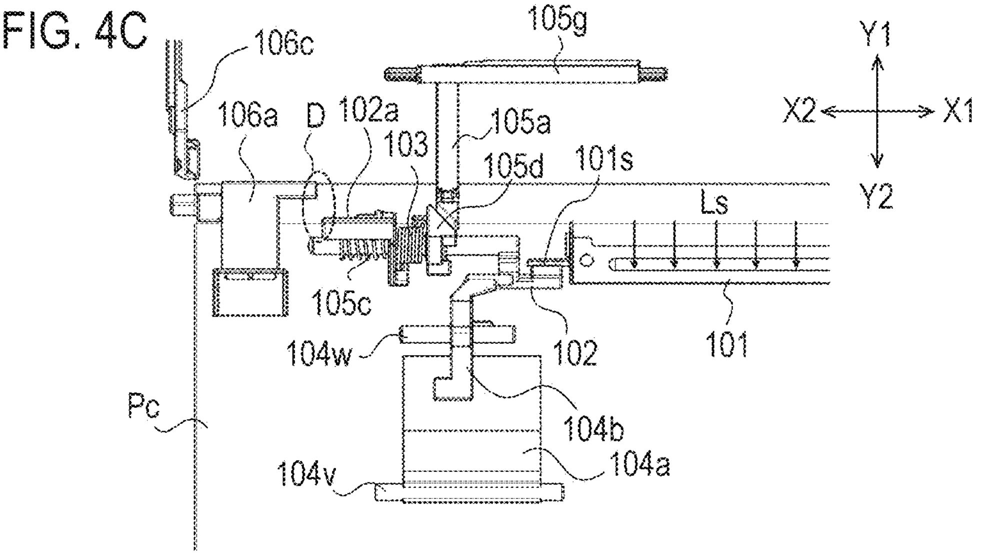

FIGS. 4A to 4C are explanatory diagrams of the shutter opening/closing mechanism in a state in which the shutter opening/closing member 102 is situated at the second position. When only the process cartridge Pc is attached to the apparatus main body 20 of the image forming apparatus 10 and the door 21 is in the open state, the shutter opening/closing member 102 is situated at the second position. When the shutter opening/closing member 102 is situated at the second position, the shutter member 101 is situated at the blocking position of blocking the laser light Ls, and the laser exposing unit 1000 is in a non-emitting state of not being able to emit the laser light Ls to the photosensitive drum 100.

FIG. 4A is a schematic perspective view of the shutter opening/closing mechanism in a state in which the shutter opening/closing member 102 is situated at the second position. FIG. 4B is a side view of FIG. 4A, viewing part of the members of the shutter opening/closing mechanism in the X1 direction. FIG. 4C is a top view of FIG. 4A.

The shutter opening/closing member 102 is moved by the link mechanism 104 from the first position to the second position, in conjunction with the attaching actions of the process cartridge Pc. That is to say, the link mechanism 104 is a moving mechanism that moves the shutter opening/closing member 102 from the first position to the second position in conjunction with the attaching actions of the process cartridge Pc. The link mechanism 104 is configured including the P-link flapper 104*a*, the P-link shaft 104*b*, a P-link flapper holder 104*c*, a boss portion 104*v*, and a shaft portion 104*w*.

The P-link flapper 104*a* is a plate member that is held by the P-link flapper holder 104*c* so as to be capable of pivoting about the boss portion 104*v*, as illustrated in FIGS. 3A and 3B. When the process cartridge Pc is attached to the apparatus main body 20, the P-link flapper 104*a* comes into contact with a process cartridge rib 51 provided on the process cartridge Pc. The plate portion of the P-link flapper 104*a* is then pressed by the process cartridge rib 51, whereby the P-link flapper 104*a* pivots in the R1 direction. The P-link flapper 104*a* that is pressed by the process cartridge rib 51 pivots to a position illustrated in FIG. 4B. A protruding portion is provided that extends from the plate portion of the P-link flapper 104*a* in a direction orthogonal to the axial line direction, and upon pivoting to the position illustrated in FIG. 4B, the protruding portion comes into contact with the P-link shaft 104*b*.

The P-link shaft 104*b* is a shaft member that is held by the shutter link holder 108 so as to be capable of pivoting about the shaft portion 104*w*, as illustrated in FIG. 3A. The P-link shaft 104*b* rotates in the R2 direction by the P-link flapper 104*a* pivoting in the R1 direction and pressing the P-link shaft 104*b*. The P-link shaft 104*b* that pivots in the R2 direction then comes into contact with the shutter opening/closing member 102 and causes the shutter opening/closing member 102 to pivot in the R3 direction, so as to be moved from the first position to the second position.

An end portion 101*s* of the shutter member 101 is disposed on a path of rotation of the shutter opening/closing member 102, the shutter opening/closing member 102 presses the end portion 101*s* so as to rotate the shutter member 101, and thus the shutter member 101 moves from the blocking position to the open position. However, even though the shutter opening/closing member 102 moves to the second position, the shutter opening/closing member 102 does not come into position with the end portion 101*s* of the shutter member 101, as illustrated in FIG. 4B. Accordingly, even though the shutter opening/closing member 102 moves to the second position from the first position, the shutter member 101 does not move from the blocking position, and the laser light Ls remains in the blocked state, as illustrated in FIG. 4A. Also, the position in the rotation axial line direction (X1-X2 direction) of the shutter opening/closing member 102 at the second position is unchanged from that in the first position illustrated in FIG. 3C, as illustrated in FIG. 4C.

Attaching Actions of Toner Cartridge Tn

Next, actions of the shutter opening/closing mechanism in conjunction with attaching actions of the toner cartridge Tn will be described with reference to FIGS. 4A to 4C and 5A to 5C. The link mechanism 105 acts in coordination with the attaching actions of the toner cartridge Tn. Note that here, actions of the shutter opening/closing mechanism when the toner cartridge Tn is attached, in a state in which the process cartridge Pc is attached to the apparatus main body 20, will be described.

FIGS. 5A to 5D are explanatory diagrams of the shutter opening/closing mechanism in a state in which the shutter opening/closing member 102 is situated at the third position. When the process cartridge Pc and the toner cartridge Tn are attached to the apparatus main body 20 of the image forming apparatus 10, and the door 21 is in the open state, the shutter opening/closing member 102 is situated at the third position. When the shutter opening/closing member 102 is situated at the third position, the shutter member 101 is situated at the blocking position of blocking the laser light Ls, and the laser exposing unit 1000 is in a non-emitting state.

Figure 5A:
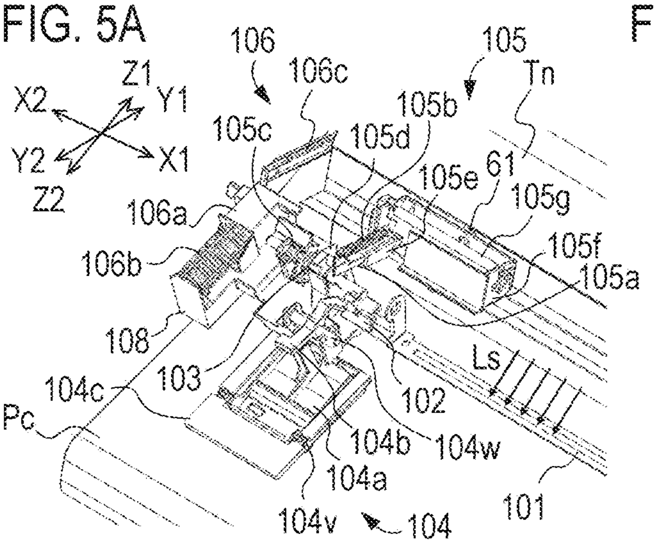
FIGS. 5A to 5D are explanatory diagrams of the shutter opening/closing mechanism in which the shutter member is situated at a third position.
Figure 5B:
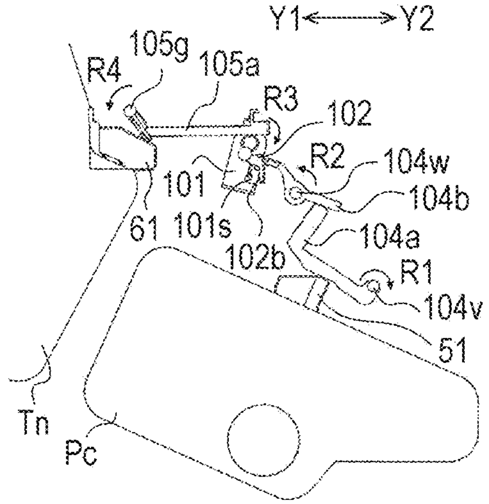
Figure 5C:
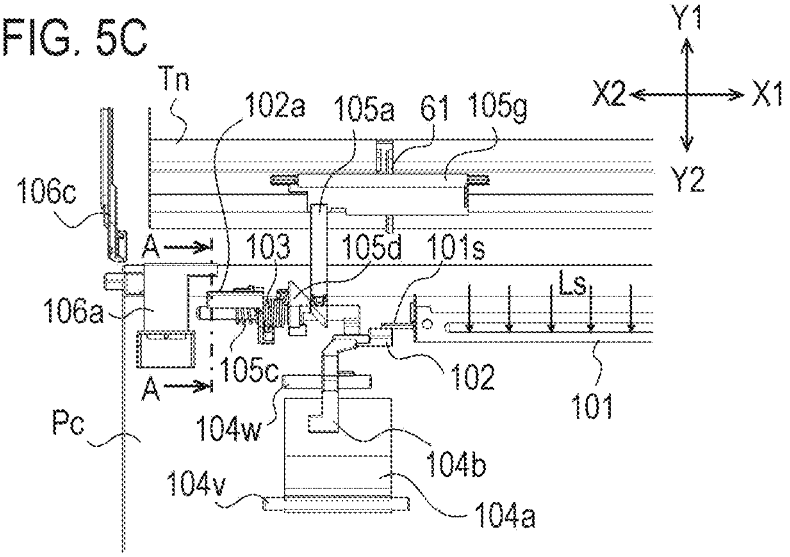
Figure 5D:
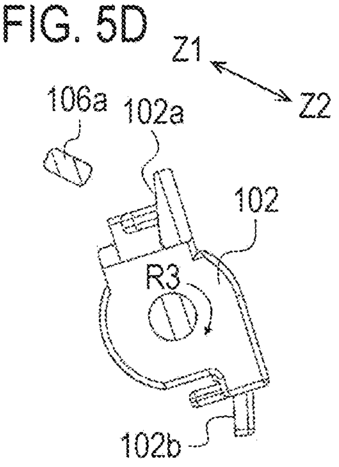

FIG. 5A is a schematic perspective view of the shutter opening/closing mechanism in a state in which the shutter opening/closing member 102 is situated at the third position. FIG. 5B is a side view of FIG. 5A, viewing part of the members of the shutter opening/closing mechanism in the X1 direction. FIG. 5C is a top view of FIG. 5A. FIG. 5D is a cross-sectional view taken along A-A in FIG. 5C, and is a diagram illustrating a positional relation between the shutter opening/closing member 102 and a later-described door link slider 106*a* as viewed in the X1 direction.

The shutter opening/closing member 102 is moved by the link mechanism 105 from the second position to the third position, in conjunction with the attaching actions of the toner cartridge Tn. That is to say, the link mechanism 105 is a moving mechanism that moves the shutter opening/closing member 102 from the second position to the third position in conjunction with the attaching actions of the toner cartridge Tn. The link mechanism 105 is configured including the T-link shaft 105*a*, the T-link shaft tension spring 105*b*, the compression spring 105*c*, the T-link cam 105*d*, a T-link shaft holder 105*e*, a T-link flapper holder 105*f*, the T-link flapper 105*g*, and the spring holding portion 105*h*.

As illustrated in FIG. 5A, the T-link flapper 105*g* is a plate member that has a shaft portion and a plate portion that extends in a direction orthogonal to an axial line direction of the shaft portion, and is held by the T-link flapper holder 105*f* so as to be capable of pivoting about the shaft portion. When the toner cartridge Tn is attached to the apparatus main body 20, a toner cartridge rib 61 that is provided to the toner cartridge Tn comes into contact with the T-link flapper

105*g*. The T-link flapper 105*g* is then pressed by the toner cartridge rib 61 and pivots in the R4 direction. Upon the T-link flapper 105*g* that is pressed by the toner cartridge rib 61 pivoting to a position illustrated in FIG. 5B, the plate portion thereof comes into contact with the T-link shaft 105*a*.

The T-link shaft 105*a* is a shaft member that is configured to be capable of movement in the axial direction, and is held by the T-link shaft holder 105*e*. The T-link shaft 105*a* is constantly biased in the Y1 direction by the T-link shaft tension spring 105*b* that is a biasing member. The Y1 direction is a direction that is parallel to the axial line direction of the T-link shaft 105*a*, and is a direction in which the T-link shaft 105*a* is away from the T-link cam 105*d*. When the T-link flapper 105*g* pivots, the T-link shaft 105*a* is pressed out in the Y2 direction from the position in FIG. 4B to the position in FIG. 5B, and comes into contact with the T-link cam 105*d*.

A distal end portion of the T-link shaft 105*a* in the axial direction (distal end portion in Y2 direction) is formed in a shape of an inclined face, as illustrated in FIG. 5C. In the same way, an opposing face of the T-link cam 105*d* that faces the T-link shaft 105*a* is also formed in a shape of an inclined face, with the same angle as the inclined face of the distal end portion of the T-link shaft 105*a*. Accordingly, when the T-link shaft 105*a* is pressed out in the Y2 direction, the inclined face shape of the T-link shaft 105*a* and the inclined face shape of the T-link cam 105*d* come into contact. The T-link cam 105*d* then linearly moves (slides) in the X2 direction, from the position illustrated in FIG. 4C to the position illustrated in FIG. 5C.

When the T-link cam 105*d* slides in the X2 direction, the shutter opening/closing member 102 that the T-link cam 105*d* is attached to also slides in the X2 direction, against the biasing force of the compression spring 105*c*. The shutter opening/closing member 102 is pressed by the T-link shaft 105*a* in the X2 direction via the T-link cam 105*d*, and thus moves from the second position illustrated in FIG. 4C to the third position illustrated in FIG. 5C. At this time, the shutter opening/closing member 102 does not come into contact with the shutter member 101, and accordingly the shutter member 101 does not move from the blocking position, and blocks the laser light Ls, as illustrated in FIG. 5A.

Closing Actions of Door 21

Next, actions of the opening/closing mechanism of the shutter member 101 in conjunction with closing actions of the door 21 will be described with reference to FIGS. 5A to 5D and 6A to 6D. Closing actions of the door 21 are performed in coordination with the link mechanism 106.

FIGS. 6A to 6D are explanatory diagrams of the shutter opening/closing mechanism in a state in which the shutter opening/closing member 102 is situated at the fourth position. When the process cartridge Pc and the toner cartridge Tn are attached to the apparatus main body 20 of the image forming apparatus 10, and the door 21 is in the closed state, the shutter opening/closing member 102 is situated at the fourth position. When the shutter opening/closing member 102 is situated at the fourth position, the shutter member 101 is situated at the open position of not blocking the laser light Ls, and the laser exposing unit 1000 is in an emitting state in which the laser light Ls can be emitted to the photosensitive drum 100.

Figure 6A:
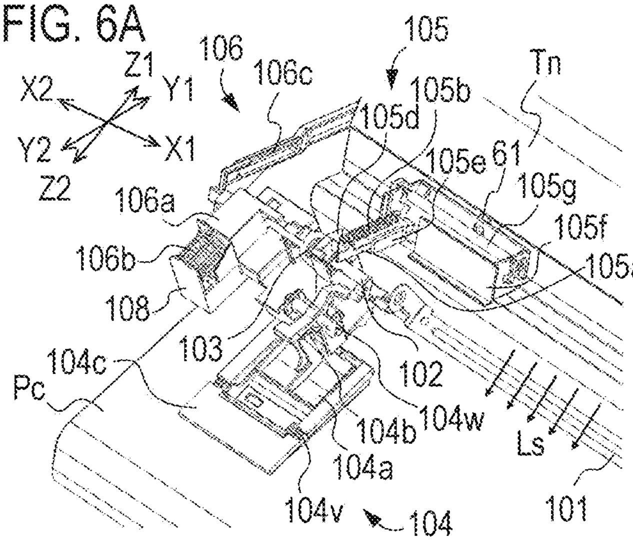
FIGS. 6A to 6D are explanatory diagrams of the shutter opening/closing mechanism in which the shutter member is situated at a fourth position.
Figure 6B:
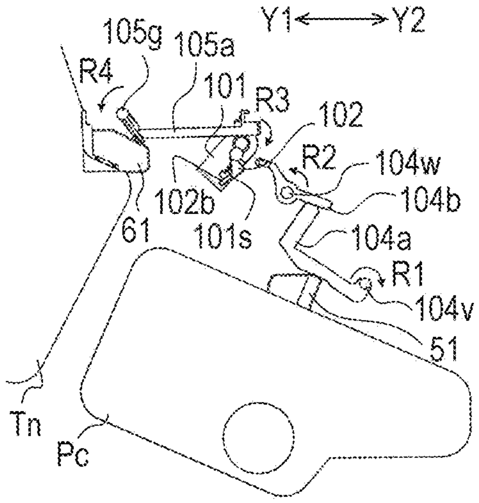
Figure 6C:
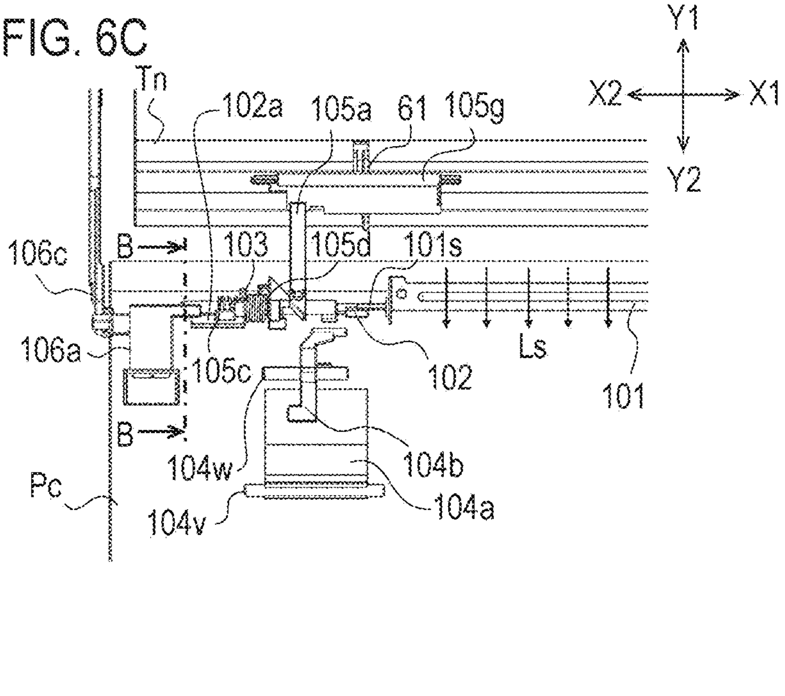
Figure 6D:
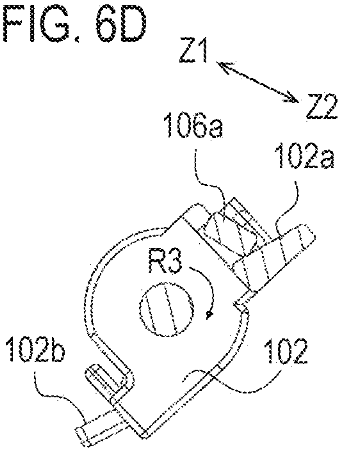

FIG. 6A is a schematic perspective view of the shutter opening/closing mechanism in a state in which the shutter opening/closing member 102 is situated at the fourth position. FIG. 6B is a side view of FIG. 6A, viewing part of the members of the shutter opening/closing mechanism in the X1 direction. FIG. 6C is a top view of FIG. 6A. FIG. 6D is a cross-sectional view taken along B-B in FIG. 6C, and is a diagram illustrating a positional relation between the shutter opening/closing member 102 and the door link slider 106*a* as viewed in the X1 direction.

The link mechanism 106 is a moving mechanism that moves the shutter opening/closing member 102 from the third position to the fourth position in conjunction with the closing actions of the door 21. The link mechanism 106 is configured including the door link slider 106*a*, the door link compression spring 106*b*, and a door link rod 106*c*.

The door link rod 106*c* is a linearly-moving member that moves in a Y1-Y2 direction in coordination with the opening/closing actions of the door 21. When the user closes the door 21 from the state in FIGS. 5A to 5C, such that the door 21 transitions from the open state to the closed state, the door link rod 106*c* moves in the Y2 direction from the position illustrated in FIG. 5A to the position illustrated in FIG. 6A.

Upon moving in the Y2 direction, the door link rod 106*c* comes into contact with the door link slider 106*a*. The door link slider 106*a* is a sliding member that is configured to be slidable in a Z1-Z2 direction. The door link slider 106*a* is pressed by the door link rod 106*c* that has moved in the Y2 direction, and thus linearly moves in the Z2 direction over the shutter link holder 108, against the biasing force of the door link compression spring 106*b*.

FIGS. 5D and 6D illustrate change in the positional relation between the door link slider 106*a* and the shutter opening/closing member 102 at this time, before and after movement of the door link slider 106*a*. When the shutter opening/closing member 102 is situated at the third position, or at the fourth position, the abutting portion 102*a* of the shutter opening/closing member 102 is situated at a position overlapping the door link slider 106*a* in the Z2 direction.

When the shutter opening/closing member 102 is situated in the third position and the door link slider 106*a* is in a state prior to linear movement in the Z2 direction, as illustrated in FIG. 5D, the door link slider 106*a* is not in contact with the shutter opening/closing member 102. Upon being pressed by the door link rod 106*c* and linearly moving in the Z2 direction to the position illustrated in FIG. 6C, the door link slider 106*a* comes into contact with the abutting portion 102*a* of the shutter opening/closing member 102. Thus, the shutter opening/closing member 102 is pressed by the door link slider 106*a* and pivots in the R3 direction, and moves to the fourth position illustrated in FIGS. 6B and 6D.

In the process of the shutter opening/closing member 102 rotating from the third position to the fourth position, the abutting portion 102*b* of the shutter opening/closing member 102 comes into contact with the end portion 101*s* of the shutter member 101, and the shutter opening/closing member 102 causes the shutter member 101 to pivot in the R3 direction. Accordingly, the shutter member 101 moves to the open position in which the laser light Ls is not blocked, illustrated in FIGS. 6A to 6C.

According to the above, after attaching the process cartridge Pc to the apparatus main body 20, attaching the toner cartridge Tn and closing the door 21 causes the shutter opening/closing member 102 to move from the first position to the fourth position, via the second position and the third position. In the process of the shutter opening/closing member 102 moving from the third position to the fourth position, the shutter member 101 moves (pivots) from the blocking position to the open position, and the laser exposing unit 1000 is switched from the non-emitting state to the emitting state.

Closing Actions of Door 21 when Toner Cartridge Tn not Attached

Next, actions of the shutter opening/closing mechanism in a case in which the door 21 is closed in a state in which the process cartridge Pc is attached to the apparatus main body 20 and the toner cartridge Tn is not attached will be described.

As described above, in a state in which the process cartridge Pc is attached to the apparatus main body 20, the shutter opening/closing member 102 is situated at the second position, as illustrated in FIG. 4C. The second position of the shutter opening/closing member 102 is situated on the X1 direction side with respect to the third position. Further, when the shutter opening/closing member 102 is situated at the second position, the abutting portion 102*a* of the shutter opening/closing member 102 is away from the door link slider 106*a* in the X1 direction, in a D portion indicated by a dashed line in FIG. 4C. In other words, when the shutter opening/closing member 102 is situated at the second position, the abutting portion 102*a* and the door link slider 106*a* do not overlap in the Y2 direction or in the Z2 direction.

From the above-described positional relation, in a case in which the door 21 is closed without attaching the toner cartridge Tn, in a state in which the shutter opening/closing member 102 is situated at the second position, the door link slider 106*a* does not come into contact with the shutter opening/closing member 102 even when moving in the Z2 direction. Accordingly, even when the door 21 is closed, the shutter opening/closing member 102 does not move from the second position, and also the shutter member 101 does not move, either. Thus, the laser light Ls is blocked by the shutter member 101 situated at the blocking position, and the laser exposing unit 1000 remains in the non-emitting state.

Attaching Actions of Toner Cartridge Tn when Process Cartridge Pc not Attached

Next, actions of the shutter opening/closing mechanism in a case in which the door 21 is closed in a state in which the toner cartridge Tn is attached, without attaching the process cartridge Pc to the apparatus main body 20 will be described with reference to FIGS. 7A to 7C.

Figure 7A:
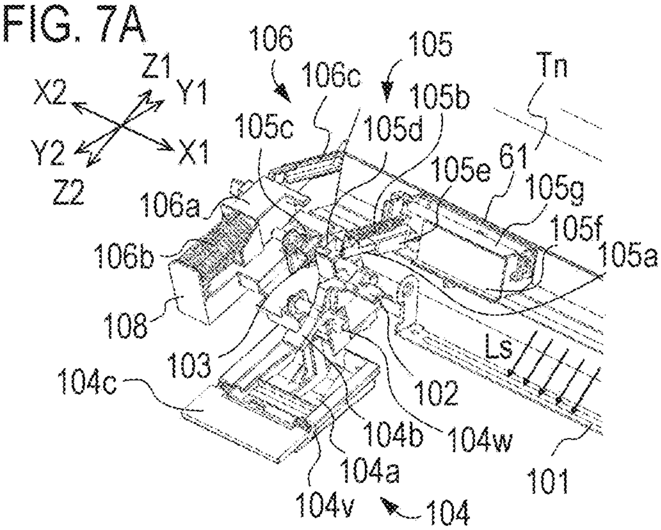
FIGS. 7A to 7C are explanatory diagrams of the shutter opening/closing mechanism in which the shutter member is situated at a fifth position.
Figure 7B:
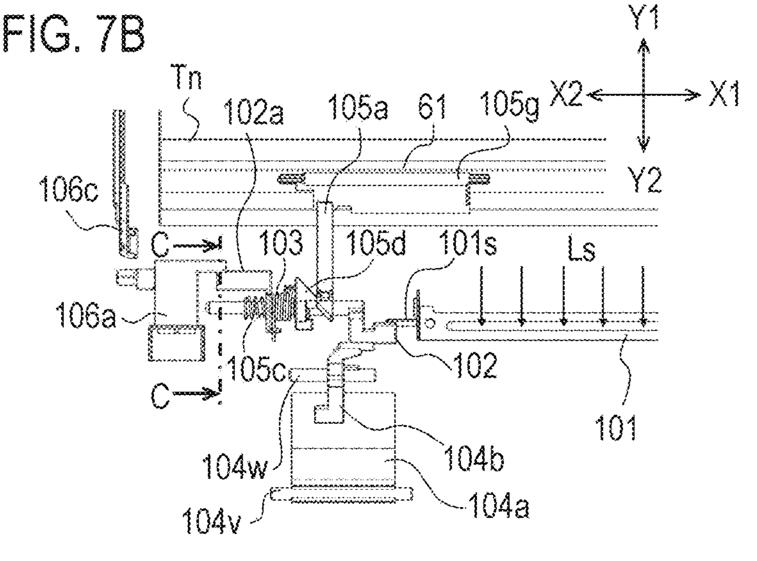
Figure 7C:
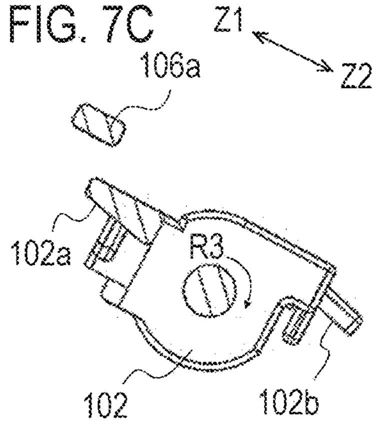

FIGS. 7A to 7C are explanatory diagrams of the shutter opening/closing mechanism in a state in which the shutter opening/closing member 102 is situated at the fifth position. When only the toner cartridge Tn is attached to the apparatus main body 20 of the image forming apparatus 10, and the door 21 is in an open state, the shutter opening/closing member 102 is situated at the fifth position. When the shutter opening/closing member 102 is situated at the fifth position, the shutter member 101 is situated at the blocking position of blocking the laser light Ls, and the laser exposing unit 1000 is in a non-emitting state.

FIG. 7A is a schematic perspective view of the shutter opening/closing mechanism in a state in which the shutter opening/closing member 102 is situated at the fifth position. FIG. 7B is a top view of FIG. 7A. FIG. 7C is a cross-sectional view taken along C-C in FIG. 7B, and is a diagram illustrating a positional relation between the shutter opening/closing member 102 and the door link slider 106*a* as viewed in the X1 direction.

In a case in which the toner cartridge Tn is attached to the apparatus main body 20 to which the process cartridge Pc is not attached, the T-link shaft 105*a* moves in the Y2 direction, toward the shutter opening/closing member 102 situated at the first position. Thus, the T-link cam 105*d* is pressed in the X2 direction by the T-link shaft 105*a*, and the shutter opening/closing member 102 also moves in the X2 direction, from the first position to the fifth position.

In the state in which the shutter opening/closing member 102 is situated at the fifth position, as illustrated in FIG. 7C, the door link slider 106*a* is situated at a position away from the abutting portion 102*a* of the shutter opening/closing member 102 in a direction perpendicular to the Z2 direction, as viewed in the X1 direction. Accordingly, even when the door 21 is closed and the door link slider 106*a* moves in the X2 direction, the door link slider 106*a* does not come into contact with the abutting portion 102*a* of the shutter opening/closing member 102. That is to say, even when the door 21 is closed, the shutter opening/closing member 102 does not move from the fifth position, and the shutter member 101 does not move, either. The laser light Ls thus remains blocked by the shutter member 101.

Closing Actions of Door 21 when Process Cartridge Pc and Toner Cartridge Tn not Attached Next, actions of the shutter opening/closing mechanism in a case in which the door 21 is closed with respect to the apparatus main body 20, in a state in which the process cartridge Pc and the toner cartridge Tn are both not attached to the apparatus main body 20, will be described.

As described above, in a case in which the process cartridge Pc and the toner cartridge Tn are both not attached to the apparatus main body 20, and also the door 21 is in an open state, the shutter opening/closing member 102 is situated at the first position illustrated in FIGS. 3A to 3C.

When the shutter opening/closing member 102 is situated at the first position, the abutting portion 102*a* is situated at a position away from the door link slider 106*a* in the direction perpendicular to the Z2 direction, in the same way as the state illustrated in FIG. 7C (when the shutter opening/closing member 102 is situated at the fifth position). Also, the first position of the shutter opening/closing member 102 is situated on the X1 direction side with respect to the third position. When the shutter opening/closing member 102 is situated at the first position, the abutting portion 102*a* of the shutter opening/closing member 102 is away from the door link slider 106*a* in the X1 direction, in the D portion indicated by the dashed line in FIG. 3C. Accordingly, when the shutter opening/closing member 102 is situated at the first position, the abutting portion 102*a* and the door link slider 106*a* do not overlap in the Z2 direction.

However, when the shutter opening/closing member 102 is situated at the first position, the abutting portion 102*a* is situated away from the door link slider 106*a* in the X1 direction, and also is situated away therefrom in the direction perpendicular to the Z2 direction. Accordingly, even when the door 21 is closed and the link mechanism 106 goes into action, and the door link slider 106*a* moves in the Z2 direction, the door link slider 106*a* does not come into contact with the shutter opening/closing member 102. That is to say, in a state in which the process cartridge Pc and the toner cartridge Tn are not attached to the apparatus main body 20, the shutter opening/closing member 102 does not move from the first position even when the door 21 is closed, and the shutter member 101 does not move either. The laser light Ls thus is blocked by the shutter member 101 situated at the blocking position, and the laser exposing unit 1000 remains in the non-emitting state.

Closing Actions of Door 21 Following Attaching Toner Cartridge Tn and Process Cartridge Pc in that Order Next, actions of the shutter opening/closing mechanism in a case in which the door 21 is closed in a state in which the toner cartridge Tn is attached to the apparatus main body 20 and thereafter the process cartridge Pc is attached, will be described.

As described above, in a case in which the process cartridge Pc and the toner cartridge Tn are not attached to the apparatus main body 20, and also the door 21 is in an open state, the shutter opening/closing member 102 is situated at the first position illustrated in FIGS. 3A to 3C.

When the shutter opening/closing member 102 is situated at the first position, upon the toner cartridge Tn being attached to the apparatus main body 20, the shutter opening/closing member 102 moves to the fifth position illustrated in FIG. 7B by actions of the link mechanism 105, as described above.

Next, when the process cartridge Pc is attached to the apparatus main body 20, the link mechanism 104 goes into action and the P-link shaft 104*b* rotates in the R2 direction as illustrated in FIG. 5B. The shutter opening/closing member 102 that is situated in the fifth position is then pressed by the P-link shaft 104*b*, and rotates in the R3 direction and moves to the third position.

Next, when the door 21 is closed with respect to the apparatus main body 20, the link mechanism 106 goes into action and the door link slider 106*a* moves in the Z2 direction, as illustrated in FIG. 5D. The door link slider 106*a* then abuts the abutting portion 102*a* of the shutter opening/closing member 102 and the shutter opening/closing member 102 pivots in the R3 direction, and moves to the fourth position illustrated in FIG. 6D. The shutter member 101 is then pressed by the shutter opening/closing member 102 and pivots in the R3 direction. The shutter member 101 then moves from the blocking position to the open position, and the laser exposing unit 1000 switches from the non-emitting state to the emitting state.

According to the above, in the first embodiment, when the door 21 is closed in a state in which both the process cartridge Pc and the toner cartridge Tn are attached to the apparatus main body 20, the laser exposing unit 1000 switches from the non-emitting state to the emitting state, regardless of the order in which the cartridges were attached. Also, in a case in which only one of, or neither of the process cartridge Pc and the toner cartridge Tn is attached to the apparatus main body 20, the laser exposing unit 1000 maintains the non-emitting state even when the door 21 is closed. That is to say, in a case in which either of the cartridges is not attached to the apparatus main body 20, the laser light Ls is blocked by the shutter member 101 and does not reach the photosensitive drum 100. Further, the laser light Ls is blocked by the shutter member 101 and does not reach the photosensitive drum 100 when the door 21 is in an open state, as well.

Regarding Potential of Photosensitive Drum Under Laser Exposure

Figure 8:
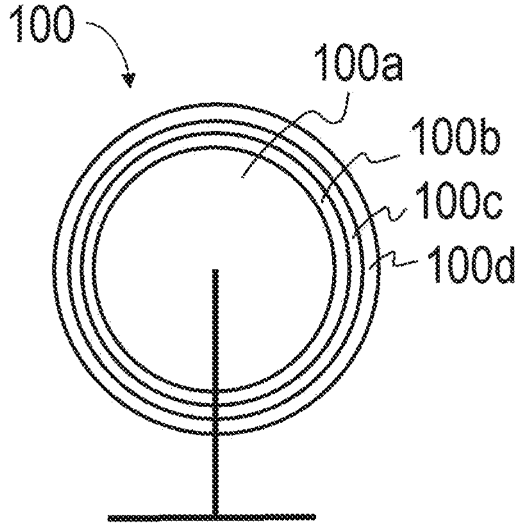
FIG. 8 is an explanatory diagram of a layer configuration of a photosensitive drum according to the first embodiment.

Next, description will be made regarding a layer configuration of the photosensitive drum 100 and surface potential thereof. FIG. 8 is an explanatory diagram of the layer configuration of the photosensitive drum 100 according to the first embodiment.

The photosensitive drum 100 is made up of a substratum layer 100*b*, a charge generating layer 100*c*, and a charge transport layer 100*d*, which are coated upon a drum cylinder 100*a* that is cylindrical. The drum cylinder 100*a* is grounded to a ground.

In the first embodiment, when the photosensitive drum 100 is charged by the charging roller 200, the surface potential (photosensitive drum potential) of the photosensitive drum 100 goes to dark potential VD. Dark potential VD is dependent on charging bias applied to the charging roller 200, potential of the drum cylinder 100*a*, and dielectric constant and film thickness of the charge transport layer 100*d*.

When light is emitted onto the photosensitive drum 100 on which dark potential VD is formed, electron-hole pairs are formed in the charge generating layer 100*c*. Holes then move to the surface of the photosensitive drum 100, and electrons move to the drum cylinder 100*a*, by dark potential VD on the surface of the photosensitive drum 100 and an electric field formed by the drum cylinder 100*a* that is grounded to the ground. Due to the holes moving to the surface of the photosensitive drum 100, the photosensitive drum potential changes to light potential VL. In the first embodiment, dark potential VD is −500 V, and light potential VL is −100 V. In the first embodiment, the photosensitive drum potential is changed from dark potential VD to light potential VL by the laser light Ls of the laser exposing unit 1000.

Overview of Charge Current Detection

When the photosensitive drum potential changes to dark potential VD or to light potential VL, current flows at the charging roller 200 and the photosensitive drum 100. Whether or not a cartridge is attached to the apparatus main body 20 is detected by the charge current detecting portion 1207 in the first embodiment, on the basis of the charge current flowing in the charging roller 200. In the image forming apparatus 10 in the first embodiment, a current detecting circuit 1400 is connected to the power source 1300 that forms a charge bias. When a predetermined transfer voltage is applied to the charging roller 200 from the power source 1300 that is a high-voltage power source, a charge current Ipri flowing at the charging roller 200 can be detected by the current detecting circuit 1400. The value of the charge current Ipri detected by the current detecting circuit 1400 is recorded in the CPU 1201 that is a computing unit.

Figure 9:
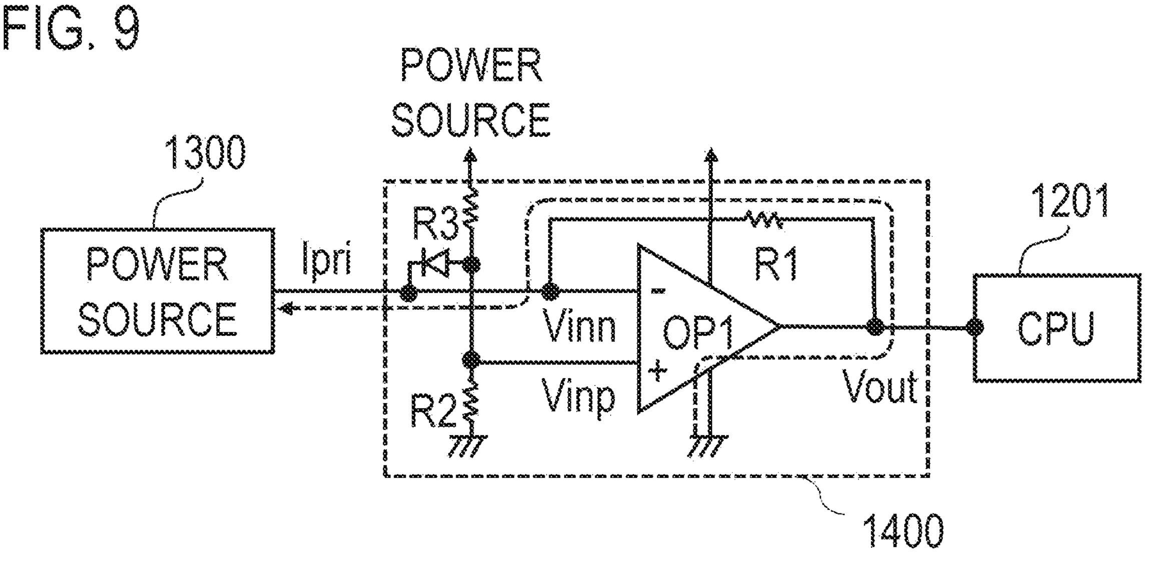
FIG. 9 is an explanatory diagram of a current detection circuit according to the first embodiment.

The current detecting circuit 1400 of the charge current detecting portion 1207 is a charge current detecting circuit that uses an operational amplifier OP1. FIG. 9 is an explanatory diagram of the current detecting circuit 1400. Note that the circuit illustrated in FIG. 9 is only an example of the current detecting circuit 1400, and application of the present invention is not limited to such a configuration.

The operational amplifier OP1 decides a potential of Vout such that a potential difference of Vinn and Vinp is 0 V. In the first embodiment, Vinp is set by power source voltage from a power source being subjected to voltage dividing by R2 and R3. Also, the charge current Ipri is designed to flow from the ground through the operational amplifier OP1 and to the power source 1300, as indicated by a dashed line in FIG. 9.

In a case in which charge actions are not performed, Vout=Vinp holds. Conversely when charge actions are performed, the charge current Ipri flows from the ground through the operational amplifier OP1, over a path indicated by the dashed line in FIG. 9. Accordingly, Vout=Vinp+CV×R1 is set taking into consideration a voltage drop of charge current value CV, which is the value of the charge current Ipri, at R1 (CV×R1). The charge current value CV can be found by reading Vout by a CPU that is a computing unit. Note that the CPU may be the CPU 1201, or a separate CPU may be provided.

In the first embodiment, whether or not the process cartridge Pc and the toner cartridge Tn are attached to the apparatus main body 20 is detected on the basis of the charge current supplied to the charging roller 200.

Photosensitive Drum Potential and Charge Current

Figure 10A:
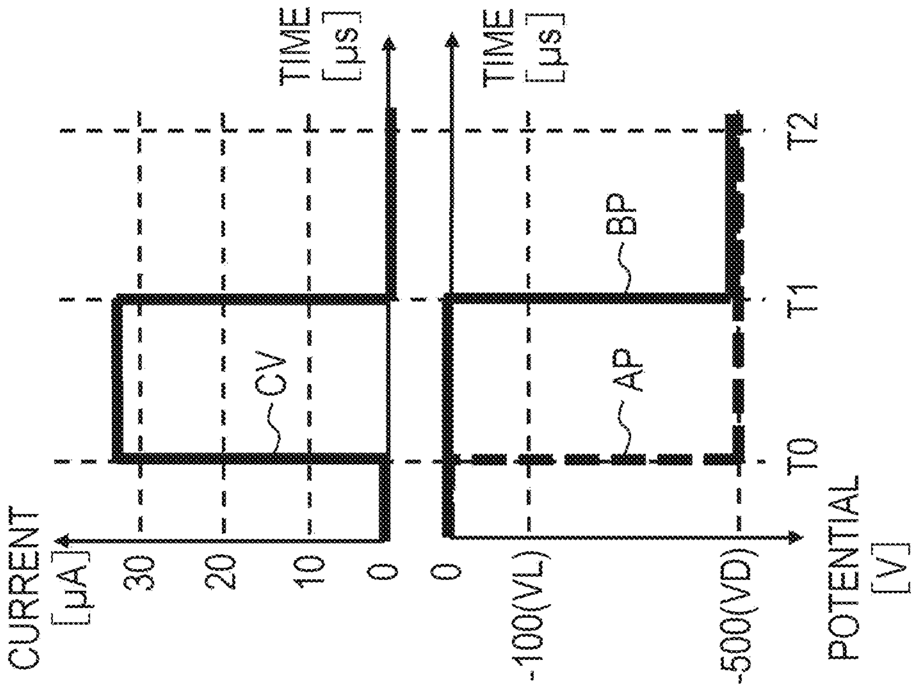
FIGS. 10A and 10B are graphs illustrating examples of transition of a photosensitive drum potential and a charge current value.
Figure 10B:
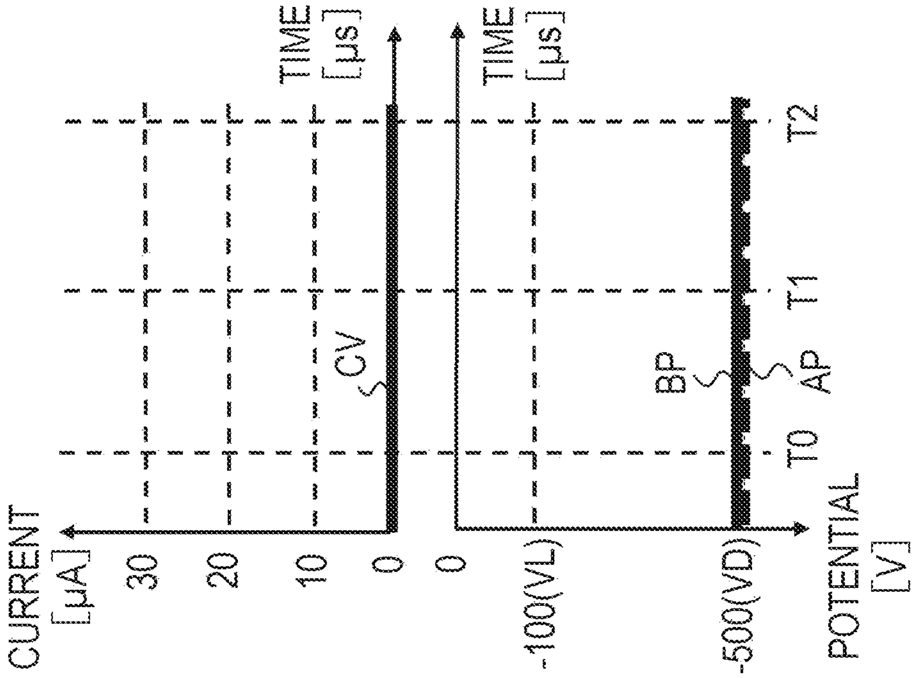

Next, a relation between the photosensitive drum potential and the value of the charge current flowing in the charging roller 200 will be described. FIGS. 10A and 10B are schematic diagrams showing transitioning of the photosensitive drum potential and the value of the charge current (charge current value CV) over time. FIGS. 10A and 10B each show a graph representing transition of the charge current value CV to the upper side, and a graph representing transition of photosensitive drum potential to the lower side. The vertical axis of the graphs to the upper side is current [PA], and the horizontal axis thereof is time [μs]. The vertical axis of the graphs to the lower side is potential [V], and the horizontal axis thereof is time [μs].

In the graphs to the lower side, the photosensitive drum potential (pre-charge potential BP) at a proximity of an upstream side of the charge portion of the photosensitive drum 100 (contact portion with the charging roller 200) is indicated by a dotted line, and the photosensitive drum potential (post-charge potential AP) at a proximity of a downstream side of the charge portion of the photosensitive drum 100 is indicated by a solid line. In other words, the potential immediately prior to being charged by the charging roller 200 is indicated by the dotted line, and the potential immediately after being charged by the charging roller 200 is indicated by the solid line. The pre-charge potential BP is photosensitive drum potential immediately prior to being charged by the charging roller 200 at the charge portion, and the post-charge potential AP is photosensitive drum potential immediately after being charged by the charging roller 200 at the charge portion.

Also, times T0, T1, and T2 are shown on the horizontal axis of each of the graphs, as predetermined times. Time TO is a drive start time of the photosensitive drum 100, time T1 is at the time of one cycle of rotation from the drive starting of the photosensitive drum 100, and time T2 is at the time of two cycles of rotation from the drive starting of the photosensitive drum 100. In other words, time T0 is the starting time for the first cycle of rotation of the photosensitive drum 100, time T1 is the ending time of the first cycle of rotation of the photosensitive drum 100, and is the starting time for the second cycle of rotation thereof, and time T2 is the ending time of the second cycle of rotation of the photosensitive drum 100, and is the starting time for the third cycle of rotation thereof.

First, description will be made regarding a case in which the photosensitive drum potential goes from a state of 0 V to dark potential VD, and is maintained there. FIG. 10A shows the photosensitive drum potential and the charge current value CV in a case in which the photosensitive drum potential goes dark potential VD at the drive start time (time T0), and is maintained at dark potential VD thereafter. For the duration from time T0 to time T1, the pre-charge potential BP indicated by the solid line transitions at 0 V. Conversely, the post-charge potential AP indicated by dotted line is charged by the charging roller 200 and transitions at −500 V (dark potential VD). When the photosensitive drum 100 makes one rotation and reaches time T1, the portion charged by the charging roller 200 reaches the charging portion again. Accordingly, from time T1 and thereafter, both the pre-charge potential BP and the post-charge potential AP transition at −500 V (dark potential VD).

As shown in FIG. 10A, up to the first cycle of rotation of the photosensitive drum 100, i.e., from the drive starting (time T0) to the end of the first cycle of rotation (time T1), a potential difference is present between the pre-charge potential BP of the photosensitive drum 100 and the charging roller 200. Accordingly, for the duration from time T0 to time T1, the photosensitive drum 100 is discharged at the charging portion, the charge current flows to the charging roller 200, and the charge current value CV rises. Upon the photosensitive drum 100 making one cycle with the photosensitive drum potential remaining at −500 V (dark potential VD), the photosensitive drum potential becomes −500 V over the entire perimeter of the photosensitive drum 100, and the potential difference between the charging roller 200 and the photosensitive drum 100 becomes 0, and accordingly no discharge to the photosensitive drum 100 is performed. Thus, no charge current flows, and accordingly the charge current value CV is zero from time T1 and thereafter, and no charge current Ipri is detected from the second cycle of rotation of the photosensitive drum 100 and thereafter.

In this way, when the photosensitive drum potential goes to dark potential VD and is maintained without change, the charge current cannot be detected from the second cycle of rotation of the photosensitive drum 100 and thereafter, and whether or not cartridges are attached cannot be detected. Accordingly, the pre-charge potential BP of the photosensitive drum 100 needs to be changed from dark potential VD to a different potential in order to detect whether or not cartridges are attached on the basis of charge current. More specifically, changing the pre-charge potential BP from dark potential VD to a potential with a smaller absolute value, from second cycle of rotation of the photosensitive drum 100 and thereafter, is suitable. Accordingly, in the first embodiment, the photosensitive drum potential is changed from dark potential VD to light potential VL of which the absolute value is smaller than dark potential VD at time T1. Details of a control method of the photosensitive drum potential in the first embodiment will be described later.

Next, a case will be described in which the image forming apparatus 10 has performed an emergency stop or the like due to some sort of trouble, and the photosensitive drum potential prior to detecting whether or not a cartridge is attached becomes indeterminate (e.g., dark potential VD). An example will be described here regarding a case in which the image forming apparatus 10 makes an emergency stop when the potential of the photosensitive drum 100 is −500 V, and driving is started immediately thereafter. FIG. 10B shows the photosensitive drum potential and the charge current value CV in a case in which the photosensitive drum potential is dark potential VD before starting driving, and is maintained at dark potential VD thereafter, as well.

In such a case, both the pre-charge potential BP and the post-charge potential AP of the photosensitive drum 100 are −500 V (dark potential VD) from before starting driving. This means that the potential difference between the pre-charge potential BP of the photosensitive drum 100 from before starting driving and the charging roller 200 is 0, and no discharge to the photosensitive drum 100 is performed. Accordingly, the charge current value CV is constantly zero from the drive starting (time T0) and thereafter, and no charge current is detected.

Thus, no charge current can be detected in cases in which the photosensitive drum potential is maintained at dark potential VD from before starting driving as well, and detection of whether or not a cartridge is attached cannot be performed. Accordingly, in the first embodiment, transfer positive bias is applied at the time of detection of whether or not a cartridge is attached, in addition to the charge bias. Specifically, in the first embodiment, transfer positive bias of +1000 V is applied to the transfer roller 500.

Detection Method of Whether or not Cartridge is Attached

Next, a detection method of whether or not a cartridge is attached according to the first embodiment will be described in detail. First, an attachment state of a cartridge to the apparatus main body 20 of the image forming apparatus 10 will be described with reference to FIGS. 11A to 11D.

FIGS. 11A to 11D are explanatory diagrams of attachment states of cartridges to the apparatus main body 20 of the image forming apparatus 10 in the first embodiment. As illustrated of each of the FIGS. 11A to 11D, the image forming apparatus 10 can assume four states, which are the following state A, state B, state C, and state D, as attachment states of cartridges.

Figure 11A:
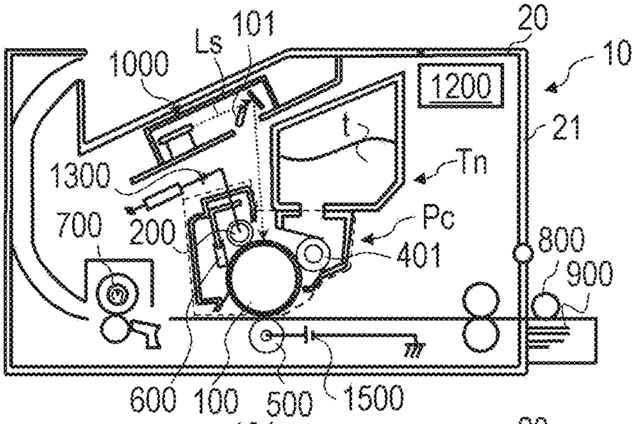
FIGS. 11A to 11D are explanatory diagrams of attachment states of cartridges of the image forming apparatus according to the first embodiment.

State A: a state in which the process cartridge Pc is attached and the toner cartridge Tn is attached (state illustrated in FIG. 11A)

Figure 11B:
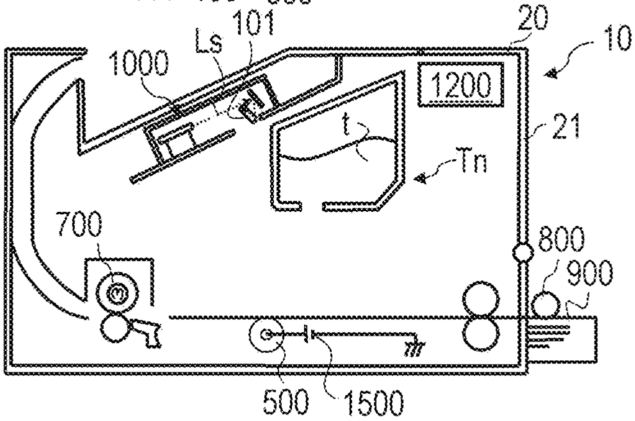

State B: a state in which no process cartridge Pc is attached and the toner cartridge Tn is attached (state illustrated in FIG. 11B)

Figure 11C:
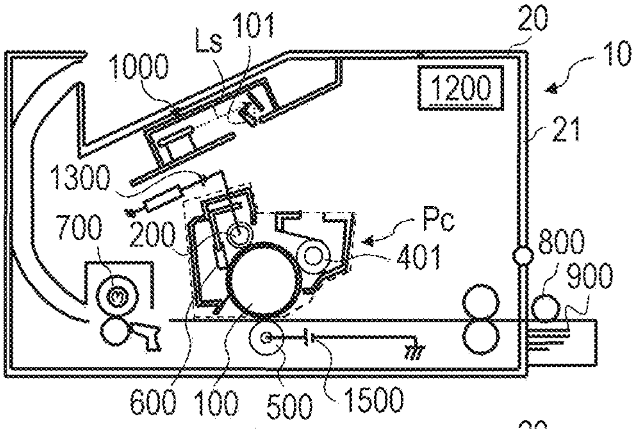

State C: a state in which the process cartridge Pc is attached and no toner cartridge Tn is attached (state illustrated in FIG. 11C)

Figure 11D:
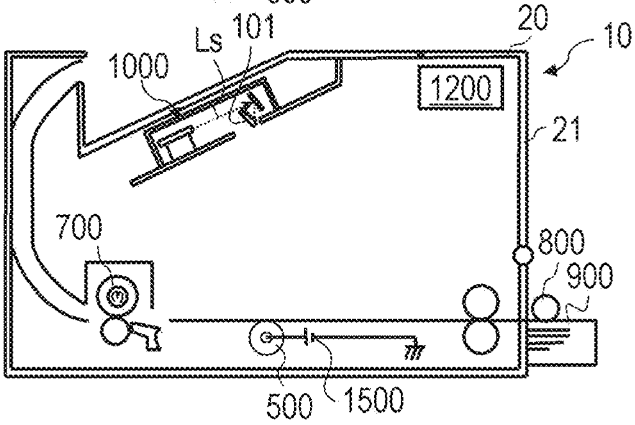

State D: a state in which no process cartridge Pc is attached and no toner cartridge is attached Tn (state illustrated in FIG. 11D)

In state A, both the process cartridge Pc and the toner cartridge Tn are attached to the apparatus main body 20 of the image forming apparatus 10, as illustrated in FIG. 11A. Accordingly, when the image forming apparatus 10 is in state A, the shutter member 101 is situated in the open position, and exposure light is emitted to the photosensitive drum 100.

In state B, only the toner cartridge Tn is attached to the apparatus main body 20 of the image forming apparatus 10, as illustrated in FIG. 11B. Accordingly, when the image forming apparatus 10 is in state B, the shutter member 101 is situated in the blocking position, and exposure light is not emitted to the photosensitive drum 100.

In state C, only the process cartridge Pc is attached to the image forming apparatus 10, as illustrated in FIG. 11C. Accordingly, when the image forming apparatus 10 is in state C, the shutter member 101 is situated in the blocking position, and exposure light is not emitted to the photosensitive drum 100.

In state D, neither the process cartridge Pc nor the toner cartridge Tn is attached to the apparatus main body 20 of the image forming apparatus 10, as illustrated in FIG. 11D. Accordingly, when the image forming apparatus 10 is in state D, the shutter member 101 is situated in the blocking position, and exposure light is not emitted to the photosensitive drum 100.

The photosensitive drum potential and charge current detection results in each state of FIGS. 11A to 11D will be described with reference to FIGS. 12A to 12E and 13A to 13D. FIGS. 12A to 12E are schematic diagrams showing transition of the photosensitive drum potential and the charge current value CV over time. In each of FIGS. 12A to 12E, a graph representing transition of the charge current value CV is shown to the upper side, and a graph representing transition of photosensitive drum potential (pre-charge potential BP and post-charge potential AP) is shown to the lower side. The vertical axis of the graphs to the upper side is current [pA], and the horizontal axis thereof is time [µs]. The vertical axis of the graphs to the lower side is potential [V], and the horizontal axis thereof is time [µs].

FIGS. 13A to 13D are explanatory diagrams of potential control of the photosensitive drum 100 at the time of detecting whether or not cartridges are attached in the first embodiment. Potential control of the photosensitive drum 100 will be described focusing on a point A on the surface of the photosensitive drum 100. At the time of detecting whether or not cartridges are attached, the developing roller 401 is separated from the photosensitive drum 100 by an abutting/separating mechanism.

Figure 13A:
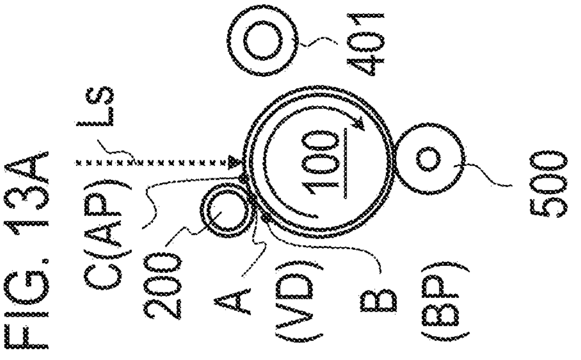
FIGS. 13A to 13D are explanatory diagrams of potential control of the photosensitive drum according to the first embodiment.

FIG. 13A illustrates a state in which the point A is situated at the contact portion with the charging roller 200 (charge portion). When the point A reaches the charge portion, the photosensitive drum potential goes to −500 V (dark potential VD) due to the charging roller 200.

Figure 13B:
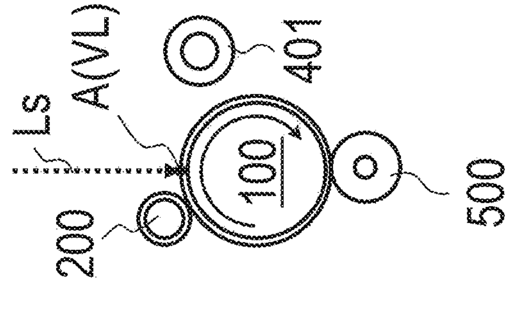

FIG. 13B illustrates a state in which the point A has reached the exposure portion that is exposed by the laser light Ls. When the point A reaches the exposure portion, the photosensitive drum potential changes from −500 V (dark potential VD) to −100 V (light potential VL) by laser light Ls from the laser exposing unit 1000.

Figure 13C:
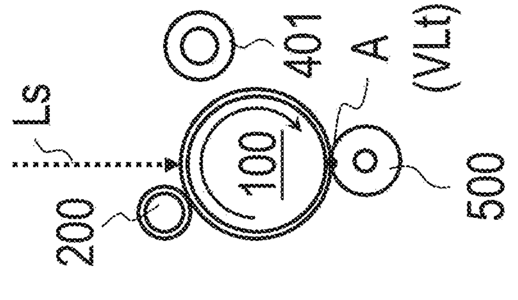

FIG. 13C illustrates a state in which the point A has reached the contact portion with the transfer roller 500 (transfer portion). When the point A reaches the transfer portion, the photosensitive drum potential changes from −100 V (light potential VL) to −50 V (potential VLt) due to the transfer roller 500 to which transfer positive bias of +1000 V has been applied.

Figure 13D:
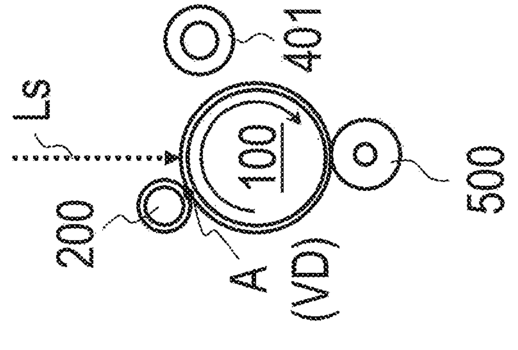

FIG. 13D illustrates a state in which the point A has reached the charge portion again. Upon the point A that has passed the exposure portion and the transfer portion arrives at the charge portion, the photosensitive drum potential changes from −50 V (potential VLt) to −500 V (dark potential VD). Thus, in the first embodiment, the photosensitive drum potential is controlled such that the photosensitive drum potential changes at the charge portion, the exposure portion, and the transfer portion.

Figure 12A:
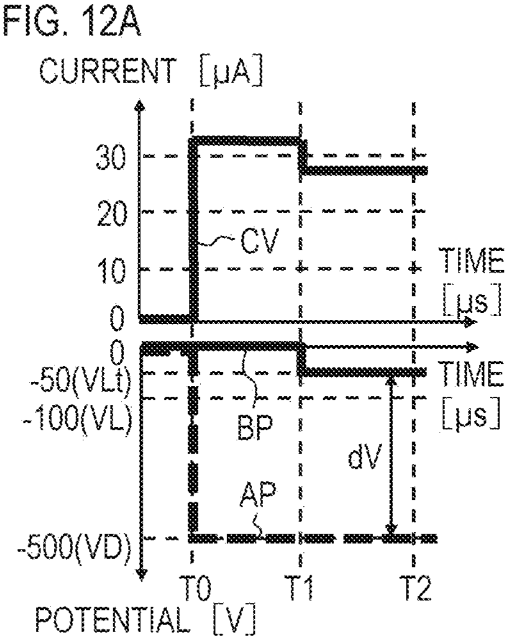
FIGS. 12A to 12E are graphs showing transition of the photosensitive drum potential and the charge current value according to the first embodiment.
Figure 12B:
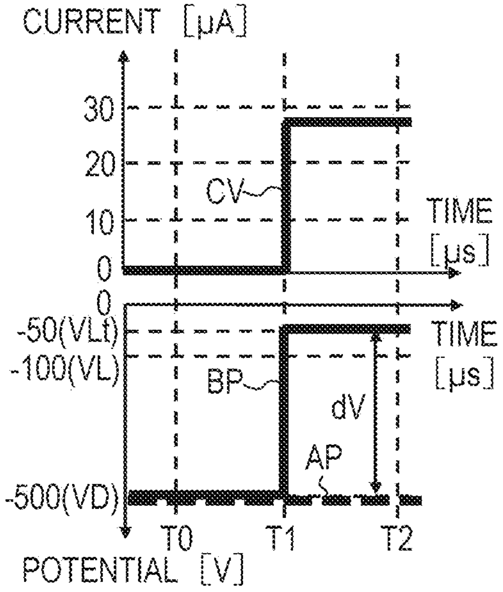

First, an example of performing potential control as described above in state A will be described. State A is the state in which the process cartridge Pc and the toner cartridge Tn are attached to the apparatus main body 20 of the image forming apparatus 10, as illustrated in FIG. 11A. FIGS. 12A and 12B illustrate photosensitive drum potential and charge current detection results in state A.

Case of State A and Initial Photosensitive Drum Potential of 0 V

First, description will be made regarding an example of a case in which the state is state A (process cartridge Pc attached, and toner cartridge Tn attached) and the photosensitive drum potential is 0 V at time T0. FIG. 12A illustrates transition of the charge current value CV and the photosensitive drum potential in a case in which the state is state A and the photosensitive drum potential at time T0 is 0 V. In state A, the photosensitive drum potential is changed by the charging roller 200, the laser exposing unit 1000 (laser light Ls), and the transfer roller 500.

In the case of this example, the pre-charge potential BP transitions at 0 V from the photosensitive drum 100 starting driving until one cycle is completed (from time T0 to time T1). Conversely, the post-charge potential AP changes from 0 V to −500 V (dark potential VD) at time T0, and thereafter is maintained at −500 V. Note that the pre-charge potential BP is the photosensitive drum potential at a position B in the proximity of the upstream side of the charge portion illustrated in FIG. 13A, and the post-charge potential AP is the photosensitive drum potential at a position C in the proximity of the downstream side of the charge portion illustrated in FIG. 13A. Thus, the surface of the photosensitive drum 100 passes the charge portion, and thereby the photosensitive drum potential of a portion thereof that has passed the charge portion changes from 0 V to −500 V (dark potential VD). At this time, the charging roller 200 discharges and charge current flows, and accordingly the charge current is detected by the current detecting circuit 1400. In the configuration of the first embodiment, the charge current value CV is detected as being 32 μA.

In state A, the toner cartridge Tn is attached to the apparatus main body 20, and the shutter member 101 is open, and accordingly the photosensitive drum 100 is exposed by the laser light Ls from the laser exposing unit 1000. Accordingly, upon the surface of the photosensitive drum 100 passing the exposure portion, the photosensitive drum potential changes from −500 V (dark potential VD) to −100 V (light potential VL). Thereafter, upon the surface of the photosensitive drum 100 passing the transfer portion, the photosensitive drum potential changes from −100 V (light potential VL) to −50 V (potential VLt).

In this way, the surface of the photosensitive drum 100 passes the transfer portion, whereby the photosensitive drum potential changes to −50 V (potential VLt), and accordingly the pre-charge potential BP changes from 0 V to −50 V at time T1 (the end time of the first cycle of rotation of the photosensitive drum 100). Accordingly, from the second cycle of rotation of the photosensitive drum 100 and thereafter (time T1 and thereafter), at the time of the surface of the photosensitive drum 100 passing the charge portion, the photosensitive drum potential changes from −50 V (potential VLt) to −500 V (dark potential VD) due to discharge of the charging roller 200. At this time, charge current flows at the charging roller 200, and accordingly the charge current is detected by the current detecting circuit 1400. In the configuration of the first embodiment, the charge current value CV at this time is detected as being 28 μA.

Case of State A and Initial Photosensitive Drum Potential of −500 V

Next, description will be made regarding an example of a case in which the state is state A (process cartridge Pc attached, and toner cartridge Tn attached) and the photosensitive drum potential is −500 V at time T0. FIG. 12B illustrates transition of the charge current value CV and the photosensitive drum potential in a case in which the photosensitive drum potential at time T0 is −500 V in state A. In a case in which the image forming apparatus 10 has made an emergency stop, for example, driving of the photosensitive drum 100 may be stated in a state in which the photosensitive drum potential is not zero. In this example, the photosensitive drum potential (pre-charge potential BP and post-charge potential AP) at the drive starting time (time T0) of the photosensitive drum 100 is −500 V. The image forming apparatus 10 is in state A in this example as well, and accordingly the photosensitive drum potential is changed by the charging roller 200, the laser exposing unit 1000 (laser light Ls), and the transfer roller 500.

In the case of this example, the pre-charge potential BP and the post-charge potential AP are maintained at −500 V (dark potential VD) from the photosensitive drum 100 starting driving until one cycle is completed (from time T0 to time T1). Thus, the surface of the photosensitive drum 100 passes the exposure portion and the transfer portion, and thereby the photosensitive drum potential changes to −100 V (light potential VL) and then to −50 V (potential VLt). Accordingly, the pre-charge potential BP changes from −500 V to −50 V at time T1 (the end time of the first cycle of rotation of the photosensitive drum 100). Thus, from the second cycle of rotation of the photosensitive drum 100 and thereafter (time T1 and thereafter), at the time of the surface of the photosensitive drum 100 passing the charge portion, the photosensitive drum potential changes from −50 V (potential VLt) to −500 V (dark potential VD) due to discharge of the charging roller 200, in this example as well. At this time, charge current flows at the charging roller 200 and the charge current value CV is 28 μA, and the charge current is detected by the current detecting circuit 1400.

In this way, according to the first embodiment, regardless of the photosensitive drum potential at the point in time of starting driving of the photosensitive drum 100, a potential difference dV is generated between the pre-charge potential BP and the post-charge potential AP at the second cycle of rotation of the photosensitive drum 100 and thereafter. That is to say, a potential difference is present between the pre-charge potential BP of the photosensitive drum 100 and the charging roller 200 at the second cycle of rotation of the photosensitive drum 100 and thereafter, and accordingly the charge current value CV does not go to 0 V, and the charge current is detected by the current detecting circuit 1400.

Case of State B

Figure 12C:
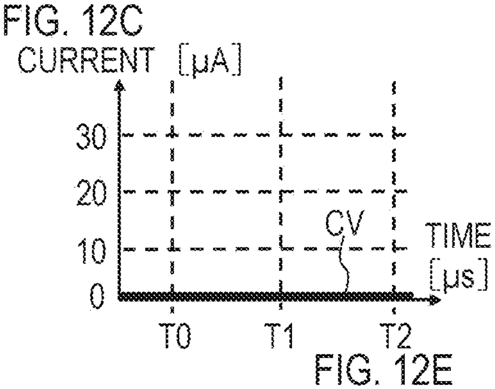

Next, description will be made regarding an example of a case in which the image forming apparatus 10 is in state B. State B is a state in which only the toner cartridge Tn is attached to the apparatus main body 20 of the image forming apparatus 10, as illustrated in FIG. 11B. FIG. 12C shows transition of the charge current value CV in state B. In FIG. 12C, transition of the photosensitive drum potential is not shown.

In the case of this example, the process cartridge Pc is not attached to the apparatus main body 20, and accordingly no charge current flows. Accordingly, the charge current value CV is constantly zero as shown in FIG. 12C, and charge current is not detected by the current detecting circuit 1400.

Figure 12D:
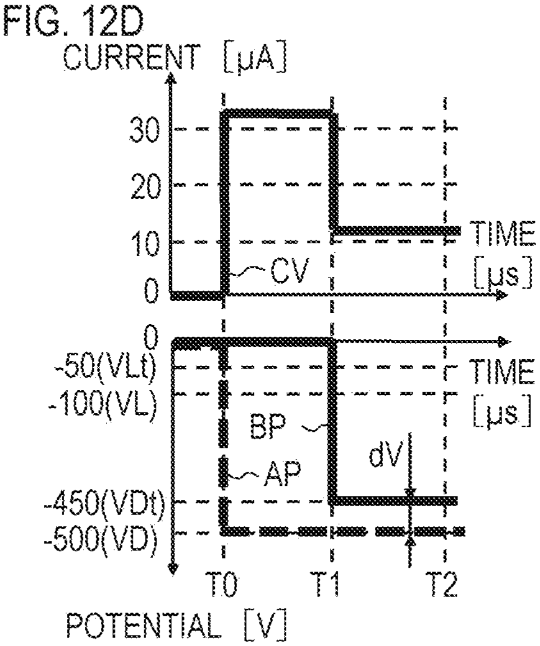
Figure 12E:
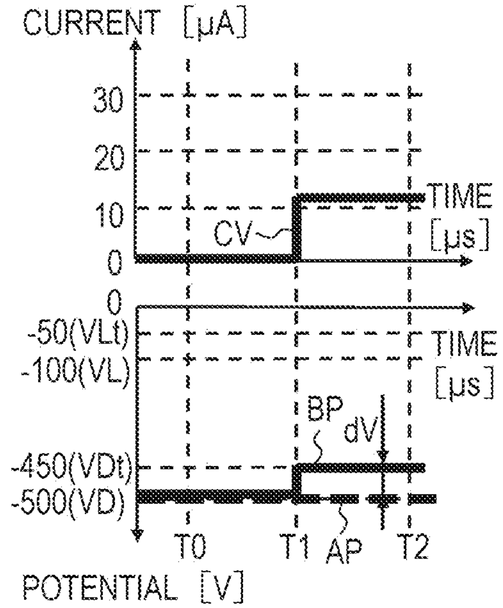

Next, an example of performing potential control as described above in state C will be described. State C is the state in which only the process cartridge Pc is attached to the apparatus main body 20 of the image forming apparatus 10, as illustrated in FIG. 11C. FIGS. 12D and 12E show photosensitive drum potential and charge current detection results in state C.

Case of State C and Initial Photosensitive Drum Potential of 0 V

First, description will be made regarding an example of a case in which the state is state C (process cartridge Pc attached, and no toner cartridge Tn attached) and the photosensitive drum potential is 0 V at time T0. FIG. 12C shows transition of the charge current value CV and the photosensitive drum potential in a case in which the photosensitive drum potential at time T0 is 0 V in state C. In state C, the photosensitive drum potential is changed by the charging roller 200 and the transfer roller 500.

In the case of this example, the pre-charge potential BP transitions at 0 V from the photosensitive drum 100 starting driving until one cycle is completed (from time T0 to time T1). Conversely, the post-charge potential AP changes from 0 V to −500 V (dark potential VD) at time T0, and thereafter is maintained at −500 V. Thus, the surface of the photosensitive drum 100 passes the charge portion, and thereby the photosensitive drum potential changes from 0 V to −500 V (dark potential VD). At this time, charge current flows at the charging roller 200, and accordingly the charge current is detected by the current detecting circuit 1400. The charge current value CV at this time is 32 μA, the same as in state A.

In state C, the toner cartridge Tn is not attached to the apparatus main body 20, and the shutter member 101 is closed, and accordingly the photosensitive drum 100 is not exposed by laser light Ls from the laser exposing unit 1000.

Accordingly, even when the surface of the photosensitive drum 100 passes the exposure portion, the photosensitive drum potential does not change from −500 V (dark potential VD). Thereafter, when the surface of the photosensitive drum 100 passes the transfer portion, the photosensitive drum potential changes from −500 V (dark potential VD) to −450 V (potential VDt).

In this way, the surface of the photosensitive drum 100 passes the transfer portion, whereby the photosensitive drum potential changes to −450 V (potential VDt), and accordingly the pre-charge potential BP changes from 0 V to −450 V at time T1 (the end time of the first cycle of rotation of the photosensitive drum 100). Accordingly, from the second cycle of rotation of the photosensitive drum 100 and thereafter (time T1 and thereafter), at the time of the surface of the photosensitive drum 100 passing the charge portion, the photosensitive drum potential changes from −450 V (potential VDt) to −500 V (dark potential VD) due to discharge of the charging roller 200. At this time, charge current flows at the charging roller 200, and accordingly the charge current is detected by the current detecting circuit 1400. In the configuration of the first embodiment, the charge current value CV at this time is detected as being 12 μA.

Case of State C and Initial Photosensitive Drum Potential of −500 V

Next, description will be made regarding an example of a case in which the state is state C (process cartridge Pc attached, and no toner cartridge Tn attached) and the photosensitive drum potential is −500 V at the initial time (time T0). FIG. 12E shows transition of the charge current value CV and the photosensitive drum potential in a case in which the photosensitive drum potential at time T0 is −500 V in state C. The image forming apparatus 10 is in state C in this case as well, and accordingly the photosensitive drum potential is changed by the charging roller 200 and the transfer roller 500.

In the case of this example, the pre-charge potential BP and the post-charge potential AP are maintained at −500 V (dark potential VD) from the photosensitive drum 100 starting driving until one cycle is completed (from time T0 to time T1). Thus, the surface of the photosensitive drum 100 passes the transfer portion, and thereby the photosensitive drum potential changes to −450 V (potential VDt). Accordingly, the pre-charge potential BP changes from −500 V to −450 V at time T1 (the end time of the first cycle of rotation of the photosensitive drum 100). Thus, from the second cycle of rotation of the photosensitive drum 100 and thereafter (time T1 and thereafter), at the time of the surface of the photosensitive drum 100 passing the charge portion, the photosensitive drum potential changes from −450 V (potential VDt) to −500 V (dark potential VD) due to discharge of the charging roller 200, in this example as well. At this time, charge current flows at the charging roller 200 and the charge current value CV is 12 μA, and the charge current is detected by the current detecting circuit 1400.

In this way, according to the first embodiment, regardless of the photosensitive drum potential at the point in time of starting driving of the photosensitive drum 100, the potential difference dV is generated between the pre-charge potential BP and the post-charge potential AP at the second cycle of rotation of the photosensitive drum 100 and thereafter, even in a case in which the toner cartridge Tn is not attached. That is to say, a potential difference is present between the pre-charge potential BP of the photosensitive drum 100 and the charging roller 200 at the second cycle of rotation of the photosensitive drum 100 and thereafter, and accordingly the charge current value CV does not go to 0 V, and the charge current is detected by the current detecting circuit 1400.

Case of State D

Next, description will be made regarding an example of a case in which the image forming apparatus 10 is in state D. State D is a state in which neither the process cartridge Pc nor the toner cartridge Tn is attached to the apparatus main body 20. In the case of this example, the process cartridge Pc is not attached to the apparatus main body 20, and accordingly no charge current flows, in the same way as with state B. Accordingly, the charge current value CV is constantly zero as shown in FIG. 12C, and charge current is not detected by the current detecting circuit 1400.

Thus, according to the configuration of the first embodiment, at the second cycle of rotation of the photosensitive drum 100 and thereafter, the charge current value CV of 28 μA is detected when in state A, the charge current value CV of 12 μA is detected when in state C, and no charge current value CV is detected when in state B or state D. That is to say, in a case in which the process cartridge Pc is attached to the apparatus main body 20, difference is generated in the charge current value CV of the charge current detected, depending on whether or not the toner cartridge Tn is attached. Also, in a case in which the process cartridge Pc is not attached to the apparatus main body 20, no charge current is detected. According to such a configuration, whether or not the cartridges are attached to the apparatus main body 20 can be determined, on the basis of the charge current detected by the charge current detecting portion 1207.

Cartridge Attachment Determination Sequence

Figure 14:
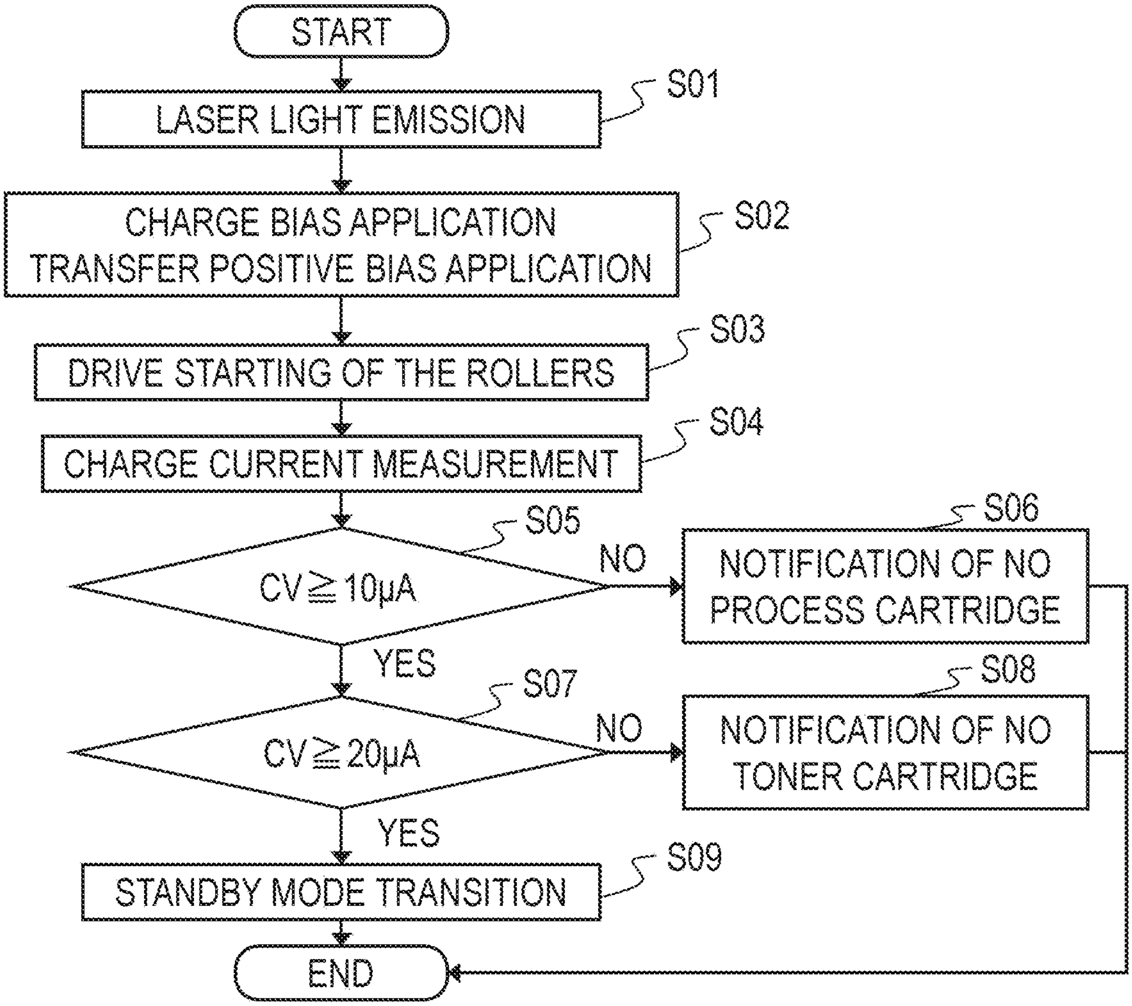
FIG. 14 is a flowchart of a cartridge attachment determination sequence according to the first embodiment.

Next, description will be made regarding a cartridge attachment determination sequence, in which the control portion 1200 performs determination of whether or not the process cartridge Pc and the toner cartridge Tn are attached to the apparatus main body 20. FIG. 14 is a flowchart of the cartridge attachment determination sequence according to the first embodiment.

This sequence is executed when the power of the image forming apparatus 10 is turned on, and when the door 21 is closed. Conversely, in a case in which the door 21 is open, this sequence is not started and the members are not driven in the first embodiment, in order to prevent electrocution and entanglement.

When this sequence is started, emission of laser light Ls is started by the laser exposing unit 1000 in a laser light emission step of S01. At this time, when the process cartridge Pc and the toner cartridge Tn are attached to the apparatus main body 20, the laser light Ls reaches the surface of the photosensitive drum 100. Conversely, in a case in which the toner cartridge Tn is not attached to the apparatus main body 20, the laser light Ls is blocked by the shutter member 101, and is not emitted to the photosensitive drum 100.

Next, in a bias application step of S02, predetermined charge bias is applied to the charging roller 200, and predetermined transfer positive bias is applied to the transfer roller 500. Then, in a drive starting step of S03, driving of the rollers, such as the photosensitive drum 100, the charging roller 200, the transfer roller 500, and so forth, is started. The photosensitive drum potential is controlled as described above, in conjunction with starting driving of the rollers. Thereafter, in a charge current detection step of S04, the charge current value CV supplied to the charging apparatus is measured by the current detecting circuit 1400 of the charge current detecting portion 1207. In the first embodiment, the charge current value CV of the second cycle of rotation from the photosensitive drum 100 starting driving and thereafter is acquired.

Next, in a first determination step of S05, determination is made regarding whether the charge current value CV acquired in S04 is at least a first value. In the first embodiment, the first value is 10 μA, and the control portion 1200 determines whether or not CV≥10 μA holds in S05.

In a case in which S05 returns NO, i.e., in a case in which CV<10 μA, determination is made that the process cartridge Pc is not attached to the apparatus main body 20. In a first notification step of S06, notification is then made to the user that the process cartridge Pc is not attached to the apparatus main body 20. Known notification means can be used as the method of notification, examples of which include emitting a warning, making a display on a display screen of the image forming apparatus 10, transmitting information to an external device, and so forth. In this way, whether or not the process cartridge Pc is attached is determined in the first determination step. In the first embodiment, the control portion 1200 functions as a determination portion that determines whether or not the cartridge is attached to the apparatus main body 20. In a case in which notification is made in S06 that the process cartridge Pc is not attached, the cartridge attachment determination sequence ends. Control may be performed at this time to stop driving of the members.

In a case of YES in S05, i.e., in a case in which CV≥10 μA holds, determination is made that the process cartridge Pc is correctly attached to the apparatus main body 20, and the flow transitions to a second determination step of S07. In the second determination step of S07, determination is made regarding whether the charge current value CV acquired in S04 is at least a second value that is greater than the first value. In the first embodiment, the second value is 20 μA, and the control portion 1200 determines whether or not CV≥20 μA holds in S07.

In a case in which S07 returns NO, i.e., in a case in which CV<20 μA, determination is made that the toner cartridge Tn is not attached to the apparatus main body 20. In a second notification step of S08, notification is then made to the user that the toner cartridge Tn is not attached to the apparatus main body 20, in the same way as in S06. That is to say, in the first embodiment, in a case in which the charge current value is at least the first value (10 μA) and also smaller than the second value (20 μA), determination is made that the toner cartridge Tn is not attached to the apparatus main body 20. In this way, whether or not the toner cartridge Tn is attached is determined in the second determination step. In a case in which notification is made in S08 that the toner cartridge Tn is not attached, the cartridge attachment determination sequence ends. Control may be performed at this time to stop driving of the members.

In a case of YES in S07, i.e., in a case in which CV≥20 μA holds, determination is made that the toner cartridge Tn is correctly attached to the apparatus main body 20, and the flow transitions to a standby mode transition step of S09. The image forming apparatus 10 then transmissions to standby mode, in which state the image forming actions are executable, and the cartridge attachment determination sequence ends.

According to such a cartridge attachment determination sequence, determination of whether or not the process cartridge Pc is attached to the apparatus main body 20, and determination of whether or not the toner cartridge Tn is attached to the apparatus main body 20, are executed on the basis of the charge current value CV. Table 1 shows relations among whether or not the process cartridge Pc is attached, whether or not the toner cartridge Tn is attached, whether or not laser light Ls is emitted to the exposure portion of the photosensitive drum 100 when executing the cartridge attachment determination sequence, the pre-charge potential BP, the post-charge potential AP, and the charge current value CV. Note that the pre-charge potential BP, the post-charge potential AP, and the charge current value CV shown in Table 1 are all values at the point in time of the second cycle of rotation of the photosensitive drum 100 and thereafter.

TABLE 1

| Whether or not process cartridge Pc attached | Whether or not toner cartridge Tn attached | Whether or not laser light emitted to exposure portion | Pre-charge potential BP | Post-charge potential AP | Charge current value CV |
|---|---|---|---|---|---|
| Attached | Attached | Emitted | −50 V (VLt) | −500 V (VD) | At least 20 μA |
| Not attached | Attached | Not emitted | — | — | 0 |
| Attached | Not attached | Not Emitted (Blocked) | −450 V (VDt) | −500 V (VD) | At least 10 μA and smaller than 20 μA |
| Not attached | Not attached | Not emitted | — | — | 0 |

In a case in which the process cartridge Pc and the toner cartridge Tn are attached to the apparatus main body 20, the shutter member 101 is situated at the open position. Accordingly, at the time of executing the cartridge attachment determination sequence, the laser light Ls is emitted to the exposure portion of the photosensitive drum 100. Then, from the second cycle of rotation of the photosensitive drum 100 and thereafter, the pre-charge potential BP is −50 V and the post-charge potential AP is-500 V, and accordingly charge current of which the charge current value CV is at least 20 μA flows.

In a case in which the process cartridge Pc is not attached to the apparatus main body 20 and only the toner cartridge Tn is attached to the apparatus main body 20, the photosensitive drum 100 and the charging roller 200 are not disposed in the apparatus main body 20. Accordingly, the laser light Ls is not emitted to the exposure portion of the photosensitive drum 100 at the time of executing the cartridge attachment determination sequence, no charge current flows, and the charge current value CV is 0.

In a case in which the toner cartridge Tn is not attached to the apparatus main body 20 and the process cartridge Pc alone is attached to the apparatus main body 20, the shutter member 101 is situated at the blocking position. Accordingly, the laser light Ls is not emitted to the exposure portion of the photosensitive drum 100 at the time of executing the cartridge attachment determination sequence. Then, from the second cycle of rotation of the photosensitive drum 100 and thereafter, the pre-charge potential BP is −50 V and the post-charge potential AP is −500 V, and accordingly charge current of which the charge current value CV is at least 10 μA and also smaller than 20 μA flows.

In a case in which neither the process cartridge Pc nor the toner cartridge Tn is attached to the apparatus main body 20, the photosensitive drum 100 and the charging roller 200 are not disposed in the apparatus main body 20. Accordingly, the laser light Ls is not emitted to the exposure portion of the photosensitive drum 100 at the time of executing the cartridge attachment determination sequence, no charge current flows, and the charge current value CV is 0.

According to the above, a configuration is made in the first embodiment such that difference is generated in the charge current value CV detected in the second cycle of rotation of the photosensitive drum 100 and thereafter, in accordance with whether or not each cartridge is attached, and accordingly determination of whether or not cartridges are attached can be made on the basis of the charge current value CV. Also, according to this configuration, determination of whether or not cartridges are attached can be made in the second cycle of rotation of the photosensitive drum 100 and thereafter, on the basis of the charge current value CV. Accordingly, whether or not cartridges are attached can be determined in a short time without rotating the photosensitive drum 100 for long periods of time, whereby whether or not cartridges are attached can be determined efficiently, and also the lifespan of the photosensitive drum 100 can be extended. In the first embodiment, whether or not the process cartridge Pc and the toner cartridge Tn are attached can be detected in a short period of 770 ms after starting driving of the photosensitive drum 100.

Note that while the transfer roller 500 to which transfer positive bias is applied is used as a potential changing portion for changing the photosensitive drum potential in the first embodiment, this configuration is not restrictive. For example, a configuration may be made in which a light-emitting member, such as a light-emitting diode (LED) or the like that emits light to the photosensitive drum 100, is provided as the potential changing portion. That is to say, a known potential changing portion that changes the photosensitive drum potential may be provided in addition to charging members such as the charging roller 200 and so forth, and exposing units such as the laser exposing unit 1000 or the like.

Also, while the process cartridge Pc serving as the first cartridge and the toner cartridge Tn serving as the second cartridge are configured to be detachably attachable to the apparatus main body 20 in the first embodiment, the configurations of the cartridges are not limited to those described above. For example, the photosensitive drum 100 may be configured to be provided to the apparatus main body 20 independently from the process cartridge Pc. Also, for example, a configuration may be made in which the photosensitive drum 100 and the charging roller 200 are provided in different cartridges from each other. Further, a configuration that has two cartridges in a different configuration from that of the first embodiment will be described below in detail as a second embodiment according to the present invention.

Second Embodiment

A second embodiment according to the present invention will be described next. In the description below, configurations of the second embodiment that are the same configurations as in the first embodiment will be denoted by the same signs and description thereof will be omitted, and description will be primarily made regarding characteristic portions of the second embodiment. The second embodiment differs from the first embodiment regarding the configuration of cartridges that are detachably attachable to the image forming apparatus 10.

In the first embodiment, the image forming apparatus 10 having a two-unit configuration of the process cartridge Pc as the first cartridge and the toner cartridge Tn as the second cartridge is configured such that whether or not the cartridges are attached can be detected. The image forming apparatus 10 according to the second embodiment has a two-unit configuration of a drum cartridge Dm as the first cartridge and a developing cartridge Dv as the second cartridge, and is configured such that whether or not the cartridges are attached can be detected.

Figure 15:
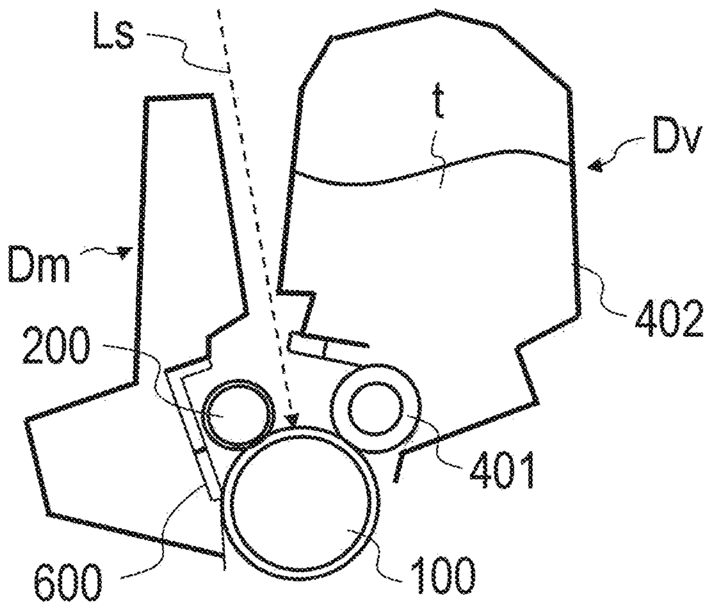
FIG. 15 is a schematic diagram of cartridges according to a second embodiment.

FIG. 15 is a schematic view of the drum cartridge Dm and the developing cartridge Dv according to the second embodiment. The drum cartridge Dm includes the photosensitive drum 100 and the cleaning apparatus 600, and is configured to be detachably attachable to the apparatus main body 20 of the image forming apparatus 10. The developing cartridge Dv includes a toner accommodation chamber 402 serving as a developer accommodation portion that accommodates the toner t therein, and the developing roller 401 that develops the toner t on the photosensitive drum 100.

In the image forming apparatus 10 according to the second embodiment, the shutter member 101 is situated at the open position or the blocking position, in accordance with whether or not the cartridges are attached, and the open/closed state of the door 21, in the same way as in the first embodiment. In the second embodiment, the shutter member 101 is situated in the open position when both the drum cartridge Dm and the developing cartridge Dv are attached to the apparatus main body 20 of the image forming apparatus 10 and also the door 21 is in a closed state. Conversely, in a case in which at least one of the drum cartridge Dm and the developing cartridge Dv is detached from the apparatus main body 20, or the door 21 is in the open state, the shutter member 101 is situated in the blocking state.

States of attachment of the cartridges to the apparatus main body 20 of the image forming apparatus 10 will be described with reference to FIGS. 16A to 16D. FIGS. 16A to 16D are explanatory diagrams of attachment states of cartridges to the apparatus main body 20 of the image forming apparatus 10 in the second embodiment. As illustrated of each of the FIGS. 16A to 16D, the image forming apparatus 10 can assume four states, which are the following state E, state F, state G, and state H, as attachment states of cartridges.

Figure 16A:
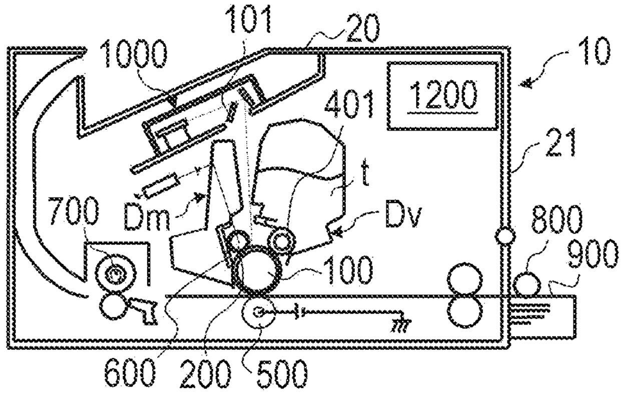
FIGS. 16A to 16D are explanatory diagrams of attached states of the cartridges of an image forming apparatus according to the second embodiment.

State E: a state in which the drum cartridge Dm is attached and the developing cartridge Dv is attached (state illustrated in FIG. 16A)

Figure 16B:
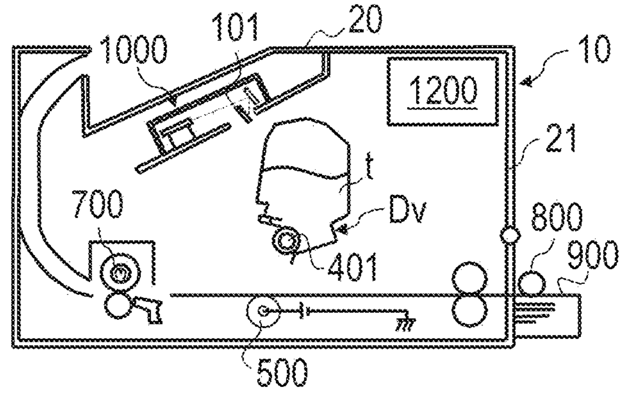

State F: a state in which no drum cartridge Dm is attached and the developing cartridge Dv is attached (state illustrated in FIG. 16B)

Figure 16C:
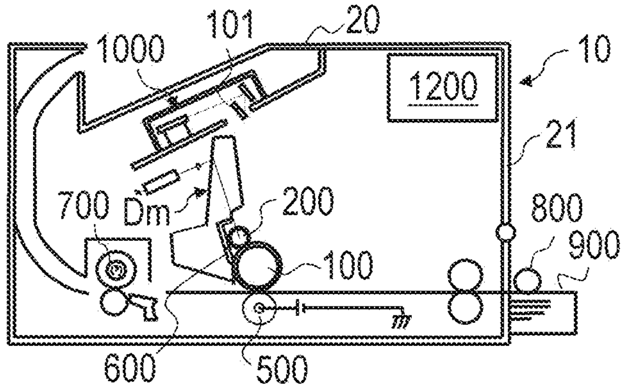

State G: a state in which the drum cartridge Dm is attached and no developing cartridge Dv is attached (state illustrated in FIG. 16C)

Figure 16D:
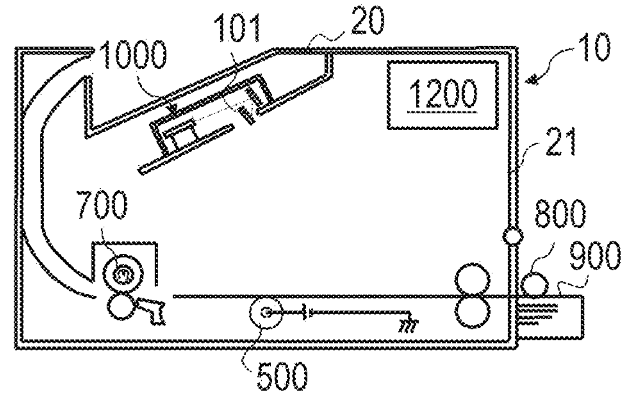

State H: a state in which no drum cartridge Dm is attached and no developing cartridge Dv is attached (state illustrated in FIG. 16D)

In state E, both the drum cartridge Dm and the developing cartridge Dv are attached to the apparatus main body 20 of the image forming apparatus 10, as illustrated in FIG. 16A. When the image forming apparatus 10 is in state E, the shutter member 101 is situated in the open position, and exposure light is emitted to the photosensitive drum 100.

In state F, only the developing cartridge Dv is attached to the apparatus main body 20 of the image forming apparatus 10, as illustrated in FIG. 16B. When the image forming apparatus 10 is in state F, the shutter member 101 is situated in the blocking position, and exposure light is not emitted to the photosensitive drum 100.

In state G, only the drum cartridge Dm is attached to the apparatus main body 20 of the image forming apparatus 10, as illustrated in FIG. 16C. When the image forming apparatus 10 is in state G, the shutter member 101 is situated in the blocking position, and exposure light is not emitted to the photosensitive drum 100.

In state H, neither the drum cartridge Dm nor the developing cartridge Dv is attached to the apparatus main body 20 of the image forming apparatus 10, as illustrated in FIG. 16D. When the image forming apparatus 10 is in state H, the shutter member 101 is situated in the blocking position, and exposure light is not emitted to the photosensitive drum 100.

As described above, in the second embodiment, the image forming apparatus 10 is configured such that laser light Ls from the laser exposing unit 1000 can be emitted to the photosensitive drum 100 by both the drum cartridge Dm and the developing cartridge Dv being correctly attached to the apparatus main body 20. According to this configuration, the photosensitive drum potential can be controlled in the same way as in the first embodiment, so as to execute the cartridge attachment determination sequence. In addition, whether or not the drum cartridge Dm serving as the first cartridge is attached to the apparatus main body 20, and whether or not the developing cartridge Dv serving as the second cartridge is attached to the apparatus main body 20, can be determined in a short amount of time.

Note that while the image forming apparatus according to the embodiments described above has a configuration of forming images using ink of one color, applications of the present invention are not limited to such a configuration. For example, the present invention is also applicable to a tandem type color image forming apparatus in which a plurality each of process cartridges and toner cartridges are provided, and image formation can be performed using a plurality of colors of ink.

Also, all configurations of the embodiments described above do not necessarily need to be satisfied in application of the present invention. Also, processing described as being performed by one device in the above-described embodiments may be shared and executed by a plurality of devices in application of the present invention. Alternatively, processing described as being performed by different devices may be executed by a single device. What sort of hardware configuration that the functions are each realized by in a computer system can be flexibly changed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-173536, filed on Oct. 5, 2023, which is hereby incorporated by reference herein in its entirety.

What is claimed is:

1. An image forming apparatus, comprising:
an apparatus main body;
an image bearing member that bears a developer image;
a first cartridge that has a charging member that charges the image bearing member, and that is detachably attachable to the apparatus main body;
a second cartridge that is detachably attachable to the apparatus main body, the second cartridge including a developer accommodation portion for accommodating a developer to be supplied to the first cartridge;
an exposure unit that has a light-emitting portion capable of emitting light, and that is capable of switching between an emitting state in which light is emitted from the light-emitting portion to the image bearing member and a non-emitting state in which light is not emitted from the light-emitting portion to the image bearing member, the exposure unit entering the non-emitting state in a state in which the second cartridge is detached from the apparatus main body;
a current detecting portion that detects a charge current flowing in the charging member;
a potential changing portion that changes a potential of a surface of the image bearing member; and
a determination portion that determines both whether or not the first cartridge is attached to the apparatus main body, and whether or not the second cartridge is attached to the apparatus main body, on the basis of the charge current detected by the current detecting portion.

2. The image forming apparatus according to claim 1,
wherein the exposure unit is in the non-emitting state in a state in which the first cartridge is detached from the apparatus main body.

3. The image forming apparatus according to claim 1,
wherein the apparatus main body includes a door that opens and closes an opening portion for allowing the first cartridge and the second cartridge to be inserted into and removed out of inside of the apparatus main body, and
wherein the exposure unit enters the non-emitting state in a state in which the door is open with respect to the opening portion.

4. The image forming apparatus according to claim 3,
wherein the exposure unit has a blocking member that is capable of moving between an open position in which an optical path of light emitted by the light-emitting portion is open such that the exposure unit is in the emitting state, and a blocking position in which the optical path is blocked such that the exposure unit is in the non-emitting state.

5. The image forming apparatus according to claim 4, further comprising:
a moving mechanism that moves the blocking member such that the blocking member is situated in the open position in a state in which the first cartridge and the second cartridge are attached to the apparatus main body and the door is closed with respect to the opening portion, and the blocking member is situated in the blocking position in a state in which at least one of the first cartridge and the second cartridge is detached from the apparatus main body, or the door is open with respect to the opening portion.

6. The image forming apparatus according to claim 5,
wherein the moving mechanism acts in coordination with a detaching action of the first cartridge with respect to the apparatus main body, a detaching action of the second cartridge with respect to the apparatus main body, and an opening/closing action of the door.

7. The image forming apparatus according to claim 1, wherein the determination portion determines that the first cartridge has been detached from the apparatus main body in a case in which the charge current is lower than a first value, and determines that the second cartridge has been detached from the apparatus main body in a case in which the charge current is at least the first value and is lower than a second value that is greater than the first value.

8. The image forming apparatus according to claim 7, wherein the determination portion determines that the first cartridge and the second cartridge have been attached to the apparatus main body in a case in which the charge current is at least the second value.

9. The image forming apparatus according to claim 1, further comprising:

notification means for, in a case of the determination unit determining that at least one of the first cartridge and the second cartridge has been detached from the apparatus main body, notifying a user to that effect.

10. The image forming apparatus according to claim 1, wherein the potential changing portion includes a transfer member that is disposed in contact with the image bearing member, and to which a transfer bias is applied.

11. The image forming apparatus according to claim 1, wherein the potential changing portion is a light-emitting member that emits light to the image bearing member.

12. The image forming apparatus according to claim 1, wherein the image bearing member is detachably attachable to the apparatus main body integrally with the first cartridge, wherein the first cartridge has a developer supply member that supplies developer to the surface of the image bearing member, and wherein the developer accommodation portion accommodates developer to be supplied to the developer supply member.

13. The image forming apparatus according to claim 1, wherein the image bearing member is detachably attachable to the apparatus main body integrally with the first cartridge.

14. An image forming apparatus, comprising:

an apparatus main body;

an image bearing member that bears a developer image;

a first cartridge that has a charging member that charges the image bearing member, and that is detachably attachable to the apparatus main body;

a second cartridge that is detachably attachable to the apparatus main body, the second cartridge including a developer accommodation portion for accommodating a developer to be supplied to the first cartridge;

an exposure unit that has a light-emitting portion capable of emitting light, and that is capable of switching between an emitting state in which light is emitted from the light-emitting portion to the image bearing member and a non-emitting state in which light is not emitted from the light-emitting portion to the image bearing member, the exposure unit entering the non-emitting state in a state in which the second cartridge is detached from the apparatus main body;

a current detecting portion that detects a charge current flowing in the charging member;

a potential changing portion that changes a potential of a surface of the image bearing member; and notification means for notifying that the first cartridge has not been attached to the apparatus main body in a case in which the charge current flowing in the charging member of the first cartridge and detected by the current detecting portion is lower than a first value, and notifies that the second cartridge has not been attached to the apparatus main body in a case in which the charge current flowing in the charging member of the first cartridge and detected by the current detecting portion is at least the first value and is lower than a second value.

15. The image forming apparatus according to claim 14, further comprising:

a control portion that transitions the image forming apparatus to a standby mode in which image formation actions can be executed, in a case in which the charge current detected by the current detecting portion is at least the second value.

* * * * *